United States Patent
Kim

(10) Patent No.: US 12,185,414 B2
(45) Date of Patent: Dec. 31, 2024

(54) METHOD AND APPARATUS FOR REPORTING BUFFER STATUS REPORT BY RRC_INACTIVE STATE UE IN MOBILE WIRELESS COMMUNICATION SYSTEM

(71) Applicant: BLACKPIN INC., Seoul (KR)

(72) Inventor: Soenghun Kim, Gyeonggi-do (KR)

(73) Assignee: BLACKPIN INC., Seoul (KR)

( * ) Notice: Subject to any disclaimer, the term of this patent is extended or adjusted under 35 U.S.C. 154(b) by 0 days.

(21) Appl. No.: 17/592,521

(22) Filed: Feb. 4, 2022

(65) Prior Publication Data

US 2023/0075866 A1    Mar. 9, 2023

(30) Foreign Application Priority Data

Aug. 18, 2021    (KR) .................. 10-2021-0109006

(51) Int. Cl.
*H04W 76/30* (2018.01)
*H04W 52/36* (2009.01)
*H04W 76/19* (2018.01)
*H04W 76/20* (2018.01)
*H04W 80/02* (2009.01)

(52) U.S. Cl.
CPC ......... *H04W 76/30* (2018.02); *H04W 52/365* (2013.01); *H04W 76/19* (2018.02); *H04W 76/20* (2018.02); *H04W 80/02* (2013.01)

(58) Field of Classification Search
None
See application file for complete search history.

(56) References Cited

U.S. PATENT DOCUMENTS

| | | | |
|---|---|---|---|
| 2020/0245393 A1* | 7/2020 | Teyeb | H04W 76/25 |
| 2022/0086946 A1* | 3/2022 | Huang | H04W 72/23 |
| 2022/0201659 A1* | 6/2022 | Agiwal | H04W 76/27 |
| 2022/0217808 A1* | 7/2022 | Chen | H04W 48/08 |
| 2022/0232659 A1* | 7/2022 | Kim | H04W 72/23 |
| 2022/0361276 A1* | 11/2022 | Jeon | H04W 72/23 |
| 2023/0262814 A1* | 8/2023 | Agiwal | H04W 76/27 370/329 |
| 2023/0328811 A1* | 10/2023 | Kim | H04W 76/11 370/328 |
| 2023/0371066 A1* | 11/2023 | Christoffersson | H04W 74/008 |

FOREIGN PATENT DOCUMENTS

| | | |
|---|---|---|
| KR | 1020210006228 A | 1/2021 |
| KR | 1020200043457 A | 12/2021 |

OTHER PUBLICATIONS

3GPP, Radio Resource Control (RRC), TS 38.331 version 15.2.1 Release 15,5G, Nr, Protocol specification, Jun. 30, 2018.

(Continued)

*Primary Examiner* — Jutai Kao
(74) *Attorney, Agent, or Firm* — Nicholas Park

(57) ABSTRACT

A method and apparatus for data transfer in RRC_INACTIVE state is provided. Method for data transfer in RRC_INACTIVE state includes receiving configuration information for second resume procedure, initiating second resume procedure and transmitting an uplink RRC message together with data in a MAC PDU. During the procedure, specific radio bearers are resumed and MAC CE are transmitted for data transmission.

19 Claims, 14 Drawing Sheets

(56) References Cited

OTHER PUBLICATIONS

3GPP, The UP common issues for small data transmissions, TSG-RAN WG2 Meeting #115 electronic R2-2107898, Aug. 9, 2021.
3GPP, BSR and PHR for SDT procedure, TSG-RAN WG2 Meeting #115 electronic R2-2108710, Aug. 9, 2021.
3rd Generation Partnership Project;Technical Specification Group Radio Access Network;NR;User Equipment (UE) radio access capabilities (Release 16), 3GPP TS 38.306 V16.4.0, Mar. 2021.
3rd Generation Partnership Project;Technical Specification Group Radio Access Network;NR;Medium Access Control (MAC) protocol specification (Release 16), 3GPP TS 38.321 V16.5.0, Jun. 2021.
3rd Generation Partnership Project;Technical Specification Group Radio Access Network;NR;Packet Data Convergence Protocol (PDCP) specification (Release 16), 3GPP TS 38.323 V16.4.0. Jun. 2021.
3rd Generation Partnership Project;Technical Specification Group Radio Access Network;NR;Radio Resource Control (RRC) protocol specification (Releas 16), 3GPP TS 38,331 V16.5.0, Jun. 2021.
Vivo, Further Discussion on User Plane Aspect of Small Data Transmission, R2-2104760, 3GPP TSG-RAN WG2 Meeting #114-e, May 11, 2021.
OPPO, Discussion on common user plane issues of SDT, R2-2104770, 3GPP TSG-RAN WG2 Meeting #114-e, May 11, 2021.
OPPO, Discussion on RACH-based SDT, R2-2104772, 3GPP TSG-RAN WG2 Meeting #114-e, May 11, 2021.
Samsung, User Plane Common Aspects of RACH and CG based SDT, R2-2104784, 3GPP TSG-RAN2 Meeting #114-e, May 10, 2021.
Samsung, Control Plane Common Aspects of RACH and CG based SDT, R2-2104785, 3GPP TSG-RAN2 Meeting #114-e, May 10, 2021.
Samsung, Details of RACH based Small Data Transmission, R2-2104786, 3GPP TSG-RAN2 Meeting #114-e, May 10, 2021.
Intel Corporation, CP-SDT remaining open issues, R2-2104882, 3GPP TSG RAN WG2 Meeting #114-e, May 11, 2021.
Intel Corporation, RA-SDT remaining open issues, R2-2104883, 3GPP TSG RAN WG2 Meeting #114-e, May 11, 2021.
Huawei, HiSilicon, Running MAC CR for Small Data, R2-2105032, 3GPP TSG-RAN2 Meeting #114-e, May 11, 2021.
Apple, Control plane aspects on the SDT procedure, R2-2105101, 3GPP TSG-RAN WG2 Meeting #114 bis electronic, May 11, 2021.
Huawei, HiSilicon, Small data transmission with RA-based schemes, R2-2105574, 3GPP TSG-RAN WG2 #114-e, May 11, 2021.
Huawei, HiSilicon, Control plane common aspects for SDT, R2-2105575, 3GPP TSG-RAN WG2 #114-e, May 11, 2021.
Ericsson, RACH based small data transmission, R2-2105758, 3GPP TSG-RAN WG2 #114-e, May 10, 2021.
Ericsson, Common aspects for SDT, R2-2105760, 3GPP TSG-RAN WG2 #114-e, May 10, 2021.
Nokia, Nokia Shanghai Bell, Details of RACH specific schemes, R2-2105878, 3GPP TSG-RAN WG2 Meeting #114 Electronic, May 11, 2021.
Qualcomm Incorporated, Discussion on open issues of SDT, R2-2105885, 3GPP TSG-RAN WG2 Meeting #114 electronic, May 11, 2021.
Qualcomm Incorporated, Discussion on open issues for RACH based SDT, R2-2105886, 3GPP TSG-RAN WG2 Meeting #114 electronic, May 11, 2021.
ZTE Coroporation (rapporteur), Introduction of SDT, R2-2105927, 3GPP TSG-RAN WG2 Meeting #114e, May 10, 2021.
InterDigital, User plane aspects of small data transmission, R2-2106043, 3GPP RAN WG2 Meeting #114e, May 10, 2021.

* cited by examiner

User Plane Protocol Stack

Control Plane Protocol Stack

METHOD AND APPARATUS FOR REPORTING BUFFER STATUS REPORT BY RRC_INACTIVE STATE UE IN MOBILE WIRELESS COMMUNICATION SYSTEM

CROSS-REFERENCE TO RELATED APPLICATION

This application claims priority to and the benefit of Korean Patent Application No. 10-2021-0109006, filed on Aug. 18, 2021, the disclosure of which is incorporated herein by reference in its entirety.

BACKGROUND

The present disclosure relates to a mobile communication system with data transfer in RRC_INACTIVE state. More specifically, the present disclosure relates to resume procedure initiation for data transfer during RRC_INACTIVE and determination on radio bearers for data transfer during RRC_INACTIVE.

To meet the increasing demand for wireless data traffic since the commercialization of 4th generation (4G) communication systems, the 5th generation (5G) system is being developed. For the sake of high, 5G system introduced millimeter wave (mmW) frequency bands (e.g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

SUMMARY

Aspects of the present disclosure are to address the problems of state transition from RRC_INACTIVE to RRC_CONNECTED for data transfer. Accordingly, an aspect of the present disclosure is to provide a method and an apparatus for data transfer in RRC_INACTIVE state. In accordance with an aspect of the present disclosure, a method of a terminal in mobile communication system is provided. In the method, UE receives from a first base station a RRCRelease message including a first information for a second resume procedure, determines a first radio bearer group based on the first information for a second procedure, receives from a second base station a system information including a second information for a second resume procedure, initiate the second resume procedure, re-establishes PDCP entities of radio bearers of a second radio bearer group, resume radio bearers of the second radio bearer group, transmits to the second base station a RRCResumeRequest message and receives from the second base station a RRCResume message.

DETAILED DESCRIPTION

Figure 1A:
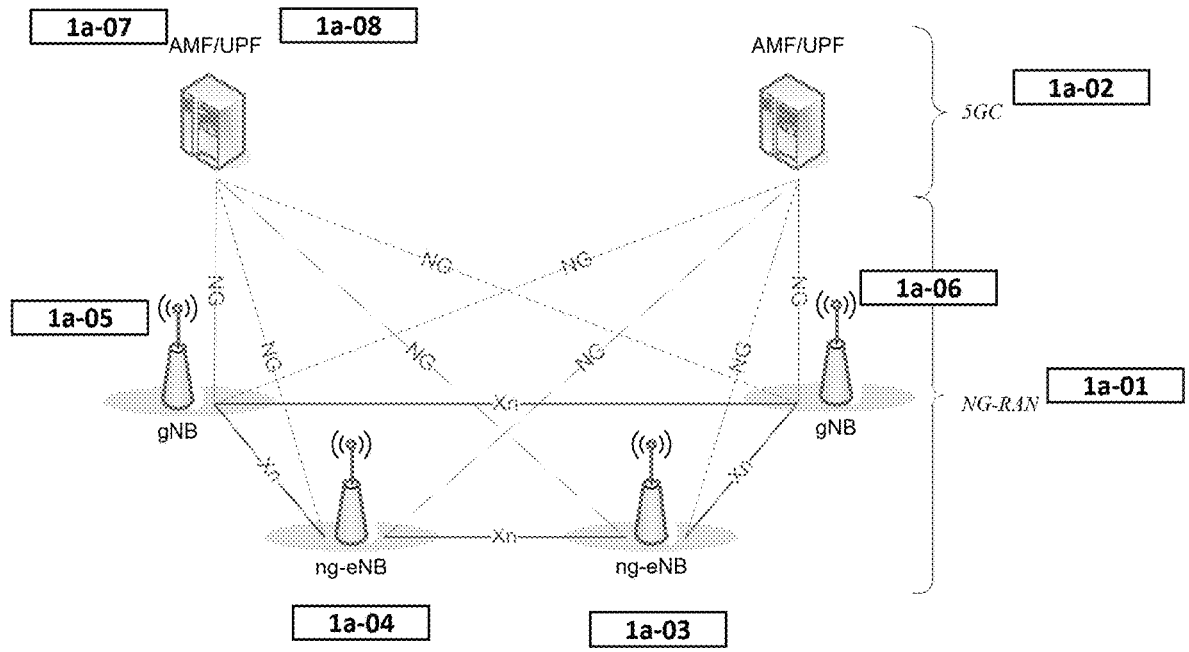
FIG. 1A is a diagram illustrating the architecture of an 5G system and a NG-RAN to which the disclosure may be applied.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

Table 1 lists the acronyms used throughout the present disclosure.

TABLE 1

| Acronym | Full name |
| --- | --- |
| 5GC | 5G Core Network |
| ACK | Acknowledgement |
| AM | Acknowledged Mode |
| AMF | Access and Mobility Management Function |
| ARQ | Automatic Repeat Request |
| AS | Access Stratum |
| ASN.1 | Abstract Syntax Notation One |
| BSR | Buffer Status Report |
| BWP | Bandwidth Part |

TABLE 1-continued

| Acronym | Full name |
| --- | --- |
| CA | Carrier Aggregation |
| CAG | Closed Access Group |
| CG | Cell Group |
| C-RNTI | Cell RNTI |
| CSI | Channel State Information |
| DCI | Downlink Control Information |
| DRB | (user) Data Radio Bearer |
| DRX | Discontinuous Reception |
| HARQ | Hybrid Automatic Repeat Request |
| IE | Information element |
| LCG | Logical Channel Group |
| MAC | Medium Access Control |
| MIB | Master Information Block |
| NAS | Non-Access Stratum |
| NG-RAN | NG Radio Access Network |
| NR | NR Radio Access |
| PBR | Prioritised Bit Rate |
| PCell | Primary Cell |
| PCI | Physical Cell Identifier |
| PDCCH | Physical Downlink Control Channel |
| PDCP | Packet Data Convergence Protocol |
| PDSCH | Physical Downlink Shared Channel |
| PDU | Protocol Data Unit |
| PHR | Power Headroom Report |
| PLMN | Public Land Mobile Network |
| PRACH | Physical Random Access Channel |
| PRB | Physical Resource Block |
| PSS | Primary Synchronisation Signal |
| PUCCH | Physical Uplink Control Channel |
| PUSCH | Physical Uplink Shared Channel |
| RACH | Random Access Channel |
| RAN | Radio Access Network |
| RA-RNTI | Random Access RNTI |

TABLE 1-continued

| Acronym | Full name |
| --- | --- |
| RAT | Radio Access Technology |
| RB | Radio Bearer |
| RLC | Radio Link Control |
| RNA | RAN-based Notification Area |
| RNAU | RAN-based Notification Area Update |
| RNTI | Radio Network Temporary Identifier |
| RRC | Radio Resource Control |
| RRM | Radio Resource Management |
| RSRP | Reference Signal Received Power |
| RSRQ | Reference Signal Received Quality |
| RSSI | Received Signal Strength Indicator |
| SCell | Secondary Cell |
| SCS | Subcarrier Spacing |
| SDAP | Service Data Adaptation Protocol |
| SDU | Service Data Unit |
| SFN | System Frame Number |
| S-GW | Serving Gateway |
| SI | System Information |
| SIB | System Information Block |
| SpCell | Special Cell |
| SRB | Signalling Radio Bearer |
| SRS | Sounding Reference Signal |
| SSB | SS/PBCH block |
| SSS | Secondary Synchronisation Signal |
| SUL | Supplementary Uplink |
| TM | Transparent Mode |
| UCI | Uplink Control Information |
| UE | User Equipment |
| UM | Unacknowledged Mode |

Table 2 lists the terminologies and their definition used throughout the present disclosure.

TABLE 2

| Terminology | Definition |
| --- | --- |
| allowedCG-List | List of configured grants for the corresponding logical channel. This restriction applies only when the UL grant is a configured grant. If present, UL MAC SDUs from this logical channel can only be mapped to the indicated configured grant configuration. If the size of the sequence is zero, then UL MAC SDUs from this logical channel cannot be mapped to any configured grant configurations. If the field is not present, UL MAC SDUs from this logical channel can be mapped to any configured grant configurations. |
| allowedSCS-List | List of allowed sub-carrier spacings for the corresponding logical channel. If present, UL MAC SDUs from this logical channel can only be mapped to the indicated numerology. Otherwise, UL MAC SDUs from this logical channel can be mapped to any configured numerology. |
| allowedServingCells | List of allowed serving cells for the corresponding logical channel. If present, UL MAC SDUs from this logical channel can only be mapped to the serving cells indicated in this list. Otherwise, UL MAC SDUs from this logical channel can be mapped to any configured serving cell of this cell group. |
| Carrier frequency | center frequency of the cell. |
| Cell | combination of downlink and optionally uplink resources. The linking between the carrier frequency of the downlink resources and the carrier frequency of the uplink resources is indicated in the system information transmitted on the downlink resources. |
| Cell Group | in dual connectivity, a group of serving cells associated with either the MeNB or the SeNB. |
| Cell reselection | A process to find a better suitable cell than the current serving cell based on the system information received in the current serving cell |
| Cell selection | A process to find a suitable cell either blindly or based on the stored information |
| Dedicated signalling | Signalling sent on DCCH logical channel between the network and a single UE. |
| discardTimer | Timer to control the discard of a PDCP SDU. Starting when the SDU arrives. Upon expiry, the SDU is discarded. |
| F | The Format field in MAC subheader indicates the size of the Length field. |

TABLE 2-continued

| Terminology | Definition |
| --- | --- |
| Field | The individual contents of an information element are referred to as fields. |
| Frequency layer | set of cells with the same carrier frequency. |
| Global cell identity | An identity to uniquely identifying an NR cell. It is consisted of cellIdentity and plmn-Identity of the first PLMN-Identity in plmn-IdentityList in SIB1. |
| gNB | node providing NR user plane and control plane protocol terminations towards the UE, and connected via the NG interface to the 5GC. |
| Handover | procedure that changes the serving cell of a UE in RRC_CONNECTED. |
| Information element | A structural element containing single or multiple fields is referred as information element. |
| L | The Length field in MAC subheader indicates the length of the corresponding MAC SDU or of the corresponding MAC CE |
| LCID | 6 bit logical channel identity in MAC subheader to denote which logical channel traffic or which MAC CE is included in the MAC subPDU |
| MAC-I | Message Authentication Code - Integrity. 16 bit or 32 bit bit string calculated by NR Integrity Algorithm based on the security key and various fresh inputs |
| Logical channel | a logical path between a RLC entity and a MAC entity. There are multiple logical channel types depending on what type of information is transferred e.g. CCCH (Common Control Channel), DCCH (Dedicate Control Channel), DTCH (Dedicate Traffic Channel), PCCH (Paging Control Channel) |
| LogicalChannelConfig | The IE LogicalChannelConfig is used to configure the logical channel parameters. It includes priority, prioritisedBitRate, allowedServingCells, allowedSCS-List, maxPUSCH-Duration, logicalChannelGroup, allowedCG-List etc |
| logicalChannelGroup | ID of the logical channel group, as specified in TS 38.321, which the logical channel belongs to |
| MAC CE | Control Element generated by a MAC entity. Multiple types of MAC CEs are defined, each of which is indicated by corresponding LCID. A MAC CE and a corresponding MAC sub-header comprises MAC subPDU |
| Master Cell Group | in MR-DC, a group of serving cells associated with the Master Node, comprising of the SpCell (PCell) and optionally one or more SCells. |
| maxPUSCH-Duration | Restriction on PUSCH-duration for the corresponding logical channel. If present, UL MAC SDUs from this logical channel can only be transmitted using uplink grants that result in a PUSCH duration shorter than or equal to the duration indicated by this field. Otherwise, UL MAC SDUs from this logical channel can be transmitted using an uplink grant resulting in any PUSCH duration. |
| NR | NR radio access |
| PCell | SpCell of a master cell group. |
| PDCP entity reestablishment | The process triggered upon upper layer request. It includes the initialization of state variables, reset of header compression and manipulating of stored PDCP SDUs and PDCP PDUs. The details can be found in 5.1.2 of 38.323 |
| PDCP suspend | The process triggered upon upper layer request. When triggered, transmitting PDCP entity set TX_NEXT to the initial value and discard all stored PDCP PDUs. The receiving entity stop and reset t-Reordering, deliver all stored PDCP SDUs to the upper layer and set RX_NEXT and RX_DELIV to the initial value |
| PDCP-config | The IE PDCP-Config is used to set the configurable PDCP parameters for signalling and data radio bearers. For a data radio bearer, discardTimer, pdcp-SN-Size, header compression parameters, t-Reordering and whether integrity protection is enabled are configured. For a signaling radio bearer, t-Reordering can be configured |
| PLMN ID Check | the process that checks whether a PLMN ID is the RPLMN identity or an EPLMN identity of the UE. |
| Primary Cell | The MCG cell, operating on the primary frequency, in which the UE either performs the initial connection establishment procedure or initiates the connection re-establishment procedure. |
| Primary SCG Cell | For dual connectivity operation, the SCG cell in which the UE performs random access when performing the Reconfiguration with Sync procedure. |
| priority | Logical channel priority, as specified in TS 38.321. an integer between 0 and 7. 0 means the highest priority and 7 means the lowest priority |
| PUCCH SCell | a Secondary Cell configured with PUCCH. |

TABLE 2-continued

| Terminology | Definition |
| --- | --- |
| Radio Bearer | Logical path between a PDCP entity and upper layer (i.e. SDAP entity or RRC) |
| RLC bearer | RLC and MAC logical channel configuration of a radio bearer in one cell group. |
| RLC bearer configuration | The lower layer part of the radio bearer configuration comprising the RLC and logical channel configurations. |
| RX_DELIV | This state variable indicates the COUNT value of the first PDCP SDU not delivered to the upper layers, but still waited for. |
| RX_NEXT | This state variable indicates the COUNT value of the next PDCP SDU expected to be received. |
| RX_REORD | This state variable indicates the COUNT value following the COUNT value associated with the PDCP Data PDU which triggered t-Reordering. |
| Serving Cell | For a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. |
| SpCell | primary cell of a master or secondary cell group. |
| Special Cell | For Dual Connectivity operation the term Special Cell refers to the PCell of the MCG or the PSCell of the SCG, otherwise the term Special Cell refers to the PCell. |
| SRB | Signalling Radio Bearers" (SRBs) are defined as Radio Bearers (RBs) that are used only for the transmission of RRC and NAS messages. |
| SRB0 | SRB0 is for RRC messages using the CCCH logical channel |
| SRB1 | SRB1 is for RRC messages (which may include a piggybacked NAS message) as well as for NAS messages prior to the establishment of SRB2, all using DCCH logical channel; |
| SRB2 | SRB2 is for NAS messages and for RRC messages which include logged measurement information, all using DCCH logical channel. SRB2 has a lower priority than SRB1 and may be configured by the network after AS security activation; |
| SRB3 | SRB3 is for specific RRC messages when UE is in (NG)EN-DC or NR-DC, all using DCCH logical channel |
| SRB4 | SRB4 is for RRC messages which include application layer measurement reporting information, all using DCCH logical channel. |
| Suitable cell | A cell on which a UE may camp. Following criteria apply The cell is part of either the selected PLMN or the registered PLMN or PLMN of the Equivalent PLMN list The cell is not barred The cell is part of at least one TA that is not part of the list of "Forbidden Tracking Areas for Roaming" (TS 22.011 [18]), which belongs to a PLMN that fulfils the first bullet above. The cell selection criterion S is fulfilled (i.e. RSRP and RSRQ are better than specific values |
| t-Reordering | Timer to control the reordering operation of received PDCP packets. Upon expiry, PDCP packets are processed and delivered to the upper layers. |
| TX_NEXT | This state variable indicates the COUNT value of the next PDCP SDU to be transmitted. |
| UE Inactive AS Context | UE Inactive AS Context is stored when the connection is suspended and restored when the connection is resumed. It includes information below. the current KgNB and KRRCint keys, the ROHC state, the stored QoS flow to DRB mapping rules, the C-RNTI used in the source PCell, the cellIdentity and the physical cell identity of the source PCell, the spCellConfigCommon within ReconfigurationWithSync of the NR PSCell (if configured) and all other parameters configured except for: parameters within ReconfigurationWithSync of the PCell; parameters within ReconfigurationWithSync of the NR PSCell, if configured; parameters within MobilityControlInfoSCG of the E-UTRA PSCell, if configured; servingCellConfigCommonSIB; |

In the present invention, "trigger" or "triggered" and "initiate" or "initiated" may be used in the same meaning.

In the present invention, "radio bearers allowed for the second resume procedure", "radio bearers for which the second resume procedure is set", and "radio bearers for which the second resume procedure is enabled" may all have the same meaning.

FIG. 1A is a diagram illustrating the architecture of an 5G system and a NG-RAN to which the disclosure may be applied.

G system consists of NG-RAN (1a-01) and 5GC (1a-02). An NG-RAN node is either:
  a gNB, providing NR user plane and control plane protocol terminations towards the UE; or an ng-eNB, providing E-UTRA user plane and control plane protocol terminations towards the UE.

The gNBs (1a-05 or 1a-06) and ng-eNBs (1a-03 or 1a-04) are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF (1a-07) and UPF (1a-08) may be realized as a physical node or as separate physical nodes.

A gNB (1a-05 or 1a-06) or an ng-eNBs (1a-03 or 1a-04) hosts the functions listed below.

Functions for Radio Resource Management such as Radio Bearer Control, Radio Admission Control, Connection Mobility Control, Dynamic allocation of resources to UEs in uplink, downlink and sidelink (scheduling); and
 IP and Ethernet header compression, uplink data decompression and encryption of user data stream; and
 Selection of an AMF at UE attachment when no routing to an MME can be determined from the information provided by the UE; and
 Routing of User Plane data towards UPF; and
 Scheduling and transmission of paging messages; and
 Scheduling and transmission of broadcast information (originated from the AMF or O&M); and
 Measurement and measurement reporting configuration for mobility and scheduling; and
 Session Management; and
 QoS Flow management and mapping to data radio bearers; and
 Support of UEs in RRC_INACTIVE state; and
 Radio access network sharing; and
 Tight interworking between NR and E-UTRA; and
 Support of Network Slicing.

The AMF (1a-07) hosts the functions such as NAS signaling, NAS signaling security, AS security control, SMF selection, Authentication, Mobility management and positioning management.

The UPF (1a-08) hosts the functions such as packet routing and forwarding, transport level packet marking in the uplink, QoS handling and the downlink, mobility anchoring for mobility etc.

Figure 1B:
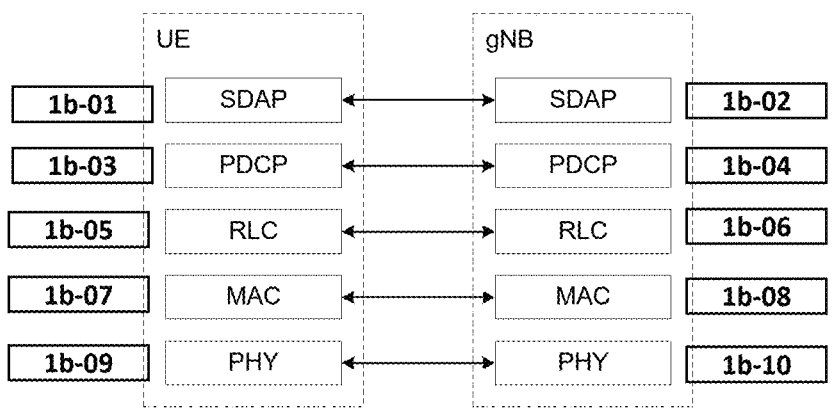
FIG. 1B is a diagram illustrating a wireless protocol architecture in an 5G system to which the disclosure may be applied.
Figure 1B:
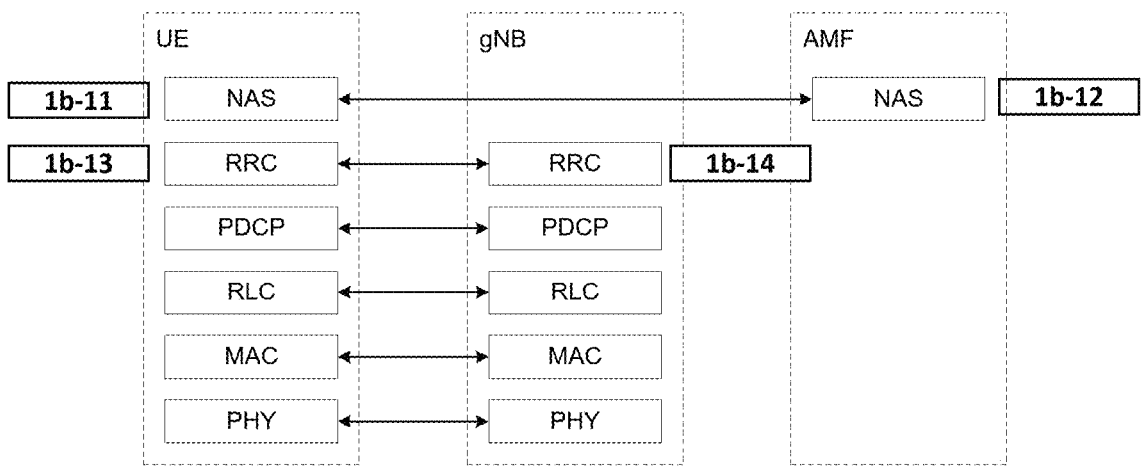

FIG. 1B is a diagram illustrating a wireless protocol architecture in an 5G system to which the disclosure may be applied.

User plane protocol stack consists of SDAP (1b-01 or 1b-02), PDCP (1b-03 or 1b-04), RLC (1b-05 or 1b-06), MAC (1b-07 or 1b-08) and PHY (1b-09 or 1b-10). Control plane protocol stack consists of NAS (1b-11 or 1b-11b-), RRC (1b-13 or 1b-14), PDCP, RLC, MAC and PHY.

Each protocol sublayer performs functions related to the operations listed in the table 3.

TABLE 3

| Sublayer | Functions |
|---|---|
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

The terminal supports three RRC states. Table 4 lists the characteristics of each state.

TABLE 4

| RRC state | Characteristic |
|---|---|
| RRC_IDLE | PLMN selection; Broadcast of system information; Cell re-selection mobility; Paging for mobile terminated data is initiated by 5GC; DRX for CN paging configured by NAS. |
| RRC_INACTIVE | PLMN selection; Broadcast of system information; Cell re-selection mobility; Paging is initiated by NG-RAN (RAN paging); RAN-based notification area (RNA) is managed by NG- RAN; DRX for RAN paging configured by NG-RAN; 5GC - NG-RAN connection (both C/U-planes) is established for UE; The UE AS context is stored in NG-RAN and the UE; NG-RAN knows the RNA which the UE belongs to. |
| RRC_CONNECTED | 5GC - NG-RAN connection (both C/U-planes) is established for UE; The UE AS context is stored in NG-RAN and the UE; NG-RAN knows the cell which the UE belongs to; Transfer of unicast data to/from the UE; Network controlled mobility including measurements. |

Figure 1C:
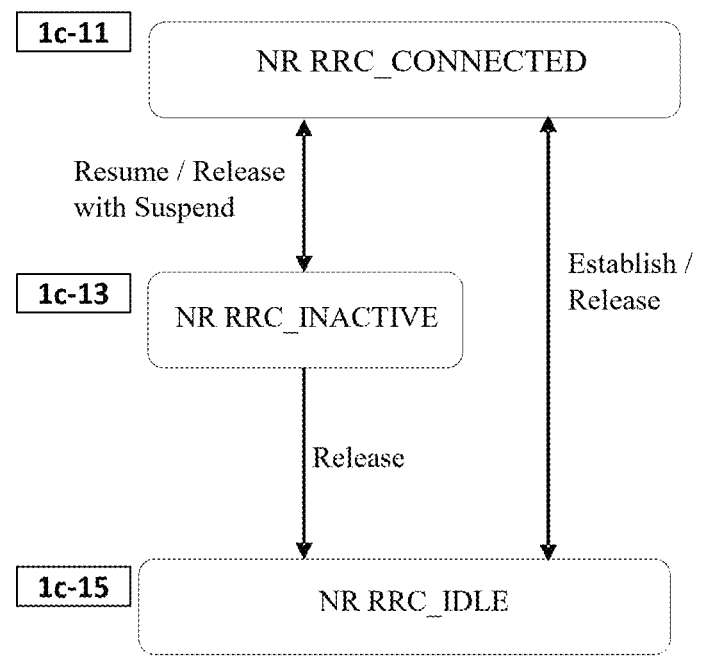
FIG. 1C is a diagram illustrating an RRC state transition.

FIG. 1C is a diagram illustrating an RRC state transition.

Between RRC_CONNECTED 1c-11 and RRC_INACTIVE 1c-13, a state transition occurs due to the exchange of the Resume message and the Release message containing the Suspend IE.

A state transition occurs between RRC_CONNECTED 1c-11 and RRC_IDLE 1c-15 through RRC connection establishment and RRC connection release.

The state transition from RRC_INACTIVE to RRC_CONNECTED involves not only signal exchange between the terminal and the base station, but also context transfer and data path change between the base stations. If the terminal has enough data to transmit, these additional procedures can be sufficiently justified, but if not, excessive overhead can reduce the efficiency of the network.

The present invention introduces a new resumption procedure capable of transmitting and receiving data without transition to RRC_CONNECTED. Hereinafter, a resume procedure for the purpose of transitioning the terminal to the RRC_CONNECTED state from the RRC_INACTIVE state is referred to as a first resume procedure, and a procedure for transmitting and receiving data while the terminal is in the RRC_INACTIVE state is referred to as a second resume procedure. Through the first resume procedure, the terminal may resume the suspended RRC connection, and through the second resumption procedure, the terminal may resume data transmission and reception. The terminal may switch to the first resume procedure while performing the second resume procedure.

Figure 2A:
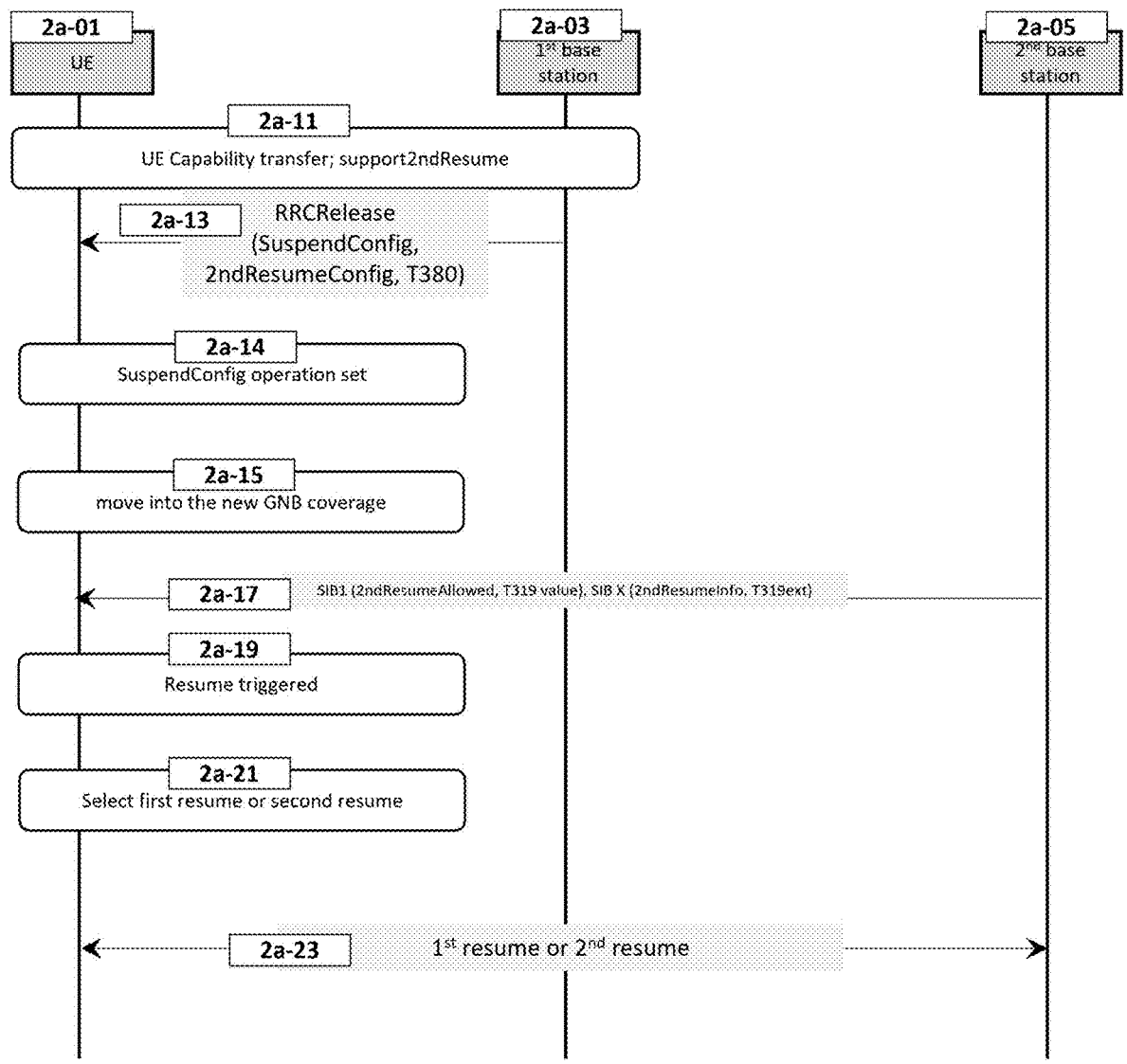
FIG. 2A is a diagram illustrating operations of a terminal and a base station according to an embodiment of the present invention.

FIG. 2A is a diagram illustrating operations of a terminal and a base station according to an embodiment of the present invention.

In a wireless communication system including a terminal 2a-01, a first base station 2a-03, and a second base station 2a-05, the terminal and the base station operate as follows.

In steps 2a-11, the terminal reports capability to the first base station or another base station. The UE capability information transfer procedure consists of transmitting an RRC control message called UECapabilityInformation containing UE capability information to the serving base station if the serving base station transmits an RRC message requesting UE capability information. UECapabilityInformation includes the following information.

<UECapabilityInformation>

1. First information related to RRC_INACTIVE: 1-bit information indicating whether the terminal supports RRC_INACTIVE. Only one 1-bit is reported regardless of the number of bands supported by the terminal.

2. Second information related to RRC_INACTIVE: information indicating whether the second resume procedure is supported or not. It may indicate whether the second resume procedure is supported for each band supported by the terminal. When the terminal supports n bands, n 1-bit information is reported.

3. Various pieces of capability information related to data transmission/reception between the terminal and the base station (for example, whether specific decoding is supported, etc.).

The terminal supporting RRC_INACTIVE supports the first resumption procedure in all frequency bands supported by the terminal. That is, the first information related to RRC_INACTIVE support is information applied to a plurality of bands, and the second information related to RRC_INACTIVE is information applied to one band. A terminal that does not support RRC_INACTIVE does not support the second resumption procedure in any frequency band that it supports. The serving base station provides appropriate NR configuration information to the UE by referring to the capability of the UE. The UE and the serving base station transmit and receive data in the RRC_CONNECTED state, and when the data transmission and reception are completed, the serving base station determines to transition the terminal state to the RRC_INACTIVE state.

In step 2a-13, the first base station transmits an RRCRelease message to the terminal. The RRCRelease message includes SuspendConfig IE, and SuspendConfig includes the following information.

<SuspendConfig>

1. The first terminal identifier: an identifier of a terminal that may be included in the Resume Request when a state transition to RRC_CONNECTED is made. It has a 40-bit length.

2. The second terminal identifier: an identifier of a terminal that may be included in the Resume Request when a state transition to RRC_CONNECTED is made. It has a 24-bit length.

3. ran-Paging Cycle: Paging cycle to be applied in RRC_INACTIVE state.

4. ran-Notification AreaInfo: Configuration information of a ran-Notification Area consisting of a list of cells and the like. The terminal initiates a resume procedure when the ran_Notification Area is changed.

5. t380: Timer related to the periodic resumption procedure.

6. NextHopChangingCount (NCC): Counter used to derive new security keys after performing the resume procedure.

7. Second resume procedure related information: List of DRB s configured with second resume procedures, 1-bit information indicating whether the second resume procedure is configured for SRB2, 1-bit information indicating whether the second resume procedure is configured for SRB4, Data size threshold of the second resume procedure (hereinafter referred to as dedicated data threshold), reference signal received power threshold of the second resume procedure (hereinafter referred to as dedicated reference signal received power threshold)

Since SRB1 among SRB1, SRB2, SRB3, and SRB4 transmits and receives the most important RRC control message, it is important to quickly transmit the RRC control message as the second resumption procedure, and the second resumption procedure is highly effective for SRB1. SRB2 and SRB4 are less important than SRB1 because relatively large messages can occur, but they still transmit important control messages, so the second resumption procedure is effective for SRB2 and SRB4. SRB3 is not used when multiple connections are not established. Accordingly, in the present invention, a second resumption procedure can be explicitly configured for SRB2 and SRB4. A second resumption procedure is not explicitly configured for SRB1 and SRB3. If a second resumption procedure is configured for at least one radio bearer, a second resumption procedure is implicitly configured for SRB1. A second resumption procedure is not configured for SRB3 under any conditions.

In step 2a-14, the terminal performs the SuspendConfig operation set. The SuspendConfig operation set is applied at a predetermined first or second time point. For the SuspendConfig operation set is performed, the following operations are sequentially performed.

<SuspendConfig Operation Set>

1. Apply suspendConfig.
2. Reset MAC.
3. Reset SRB1's RLC entity.
4. All SRBs and DRBs are suspended.
5. Start T380 set to t380.
6. Enter RRC_INACTIVE state.

The terminal applies the first time point for SuspendConfig operation set when the second resume related information is included, and the second time point if not included.

The first time point is as follows.

Earlier time point between a time point at which 100 ms has elapsed since receiving the RRCRelease message and a time point at which the lower layer successfully acknowledged the reception of the RRCRelease message.

The second time point is as follows.

Earlier time point between a time point at which 60 ms has elapsed since receiving the RRCRelease message and a time point at which the lower layer successfully acknowledged the reception of the RRCRelease message.

Different time points are used because the reliability of the RRC Release message including the second resume-related information should be higher than that of the RRC Release message not including the second resume information.

In step 2a-15, the terminal moves to a new cell. The terminal may compare the radio signal quality of the serving cell and the neighboring cell to reselect the neighboring cell having a better radio signal quality. Alternatively, a cell in which the radio signal quality is greater than or equal to a certain threshold may be selected.

In steps 2a-17, the terminal receives system information including SIB1 in a new cell. The SIB1 may include at least two types of information below.

<SIB1>
1. The value of t319
2. 1-bit information indicating whether the second resume procedure is allowed (or whether the second resume procedure is configured or possible).

If the second resume procedure is allowed, the following information is included and broadcast in system information (hereinafter, SIBX) other than SIB1.

<SIBX>
1. Data size threshold of the second resume procedure (hereinafter, referred to as public data threshold)
2. Reference signal received power threshold of the second resume procedure (hereinafter, referred to as a common reference signal received power threshold)
3. Random access transmission resource information for the second resume procedure.
4. t319ext The terminal receives the SIBX if there is at least one radio bearer configured with a second resume procedure, i.e., if the second resume procedure is configured for at least one DRB or if the second resume procedure is configured for SRB2 or SRB4.

The terminal receiving the necessary system information including SIB1 performs the RRC_INACTIVE operation shown in Table 4 in the cell.

In step 2a-19, an event that triggers the resume procedure occurs. When the upper layer or AS requests the resumption of the suspended RRC connection or when new data occurs, the resume procedure may be triggered.

In step 2a-21, the terminal triggers one of the first resume procedure and the second resume procedure. If any one of the first resumption condition sets is satisfied, the first resume procedure is triggered.

<First Resume Condition Set>
1. The upper layer requests the resumption of the suspended RRC connection.
2. RAN paging including the first identifier is received.
3. RNA update occurs.
4. Data has been generated in the radio bearer that is allowed to trigger the second resumption procedure, but at least one of the second resume condition set is not satisfied.

If all of the second resume condition sets are satisfied, the second resume procedure is triggered.

<Second Resume Condition Set>
1. Data available for transmission is generated in a bearer belonging to the first bearer set.
2. The amount of data available for transmission from the bearer belonging to the first bearer set is less than the final data threshold.
3. The reference signal received power of the current serving cell is higher than the final reference signal received power threshold.
4. The current serving cell provides transmission resource for the second resume procedure.

A radio bearer triggering second resume procedure is allowed (or a second resume procedure is allowed) means DRB a second resume procedure is allowed and SRB a second resumption procedure is allowed. SRB3 does not allow the second resume procedure, and SRB2 and SRB4 are indicated by explicit information whether the second resume procedure is allowed. When the second resume procedure is allowed in at least one radio bearer, the second resume procedure is automatically allowed in the SRB1.

The final data threshold is the lower of the dedicated data threshold and the common data threshold or alternatively the dedicated data threshold, if there are both dedicated data thresholds and common data thresholds. If there is only one, it is the final data threshold. Alternatively, if there are both dedicated data thresholds and common data thresholds, the common data threshold is the final data threshold, and if there is only one, it is the final data threshold.

The final reference signal received power threshold is a higher of the dedicated reference signal received power threshold and the common reference signal received power threshold or the dedicated reference signal received power threshold, if there are both dedicated reference signal received power threshold and common reference signal received power threshold. If there is only one, it is the final data threshold. Or, if there are both dedicated reference signal received power threshold and common reference signal received power threshold, the common reference signal received power threshold is the final reference signal received power threshold, and if there is only one, it is the final data threshold.

When at least one of the first condition sets is satisfied and all of the second condition sets are satisfied, that is, when both the first resume procedure and the second resume procedure are triggered, the terminal selects the second resume procedure.

In step 2a-23, the terminal performs a first resume procedure or a second resume procedure with the base station.

Figure 2B:
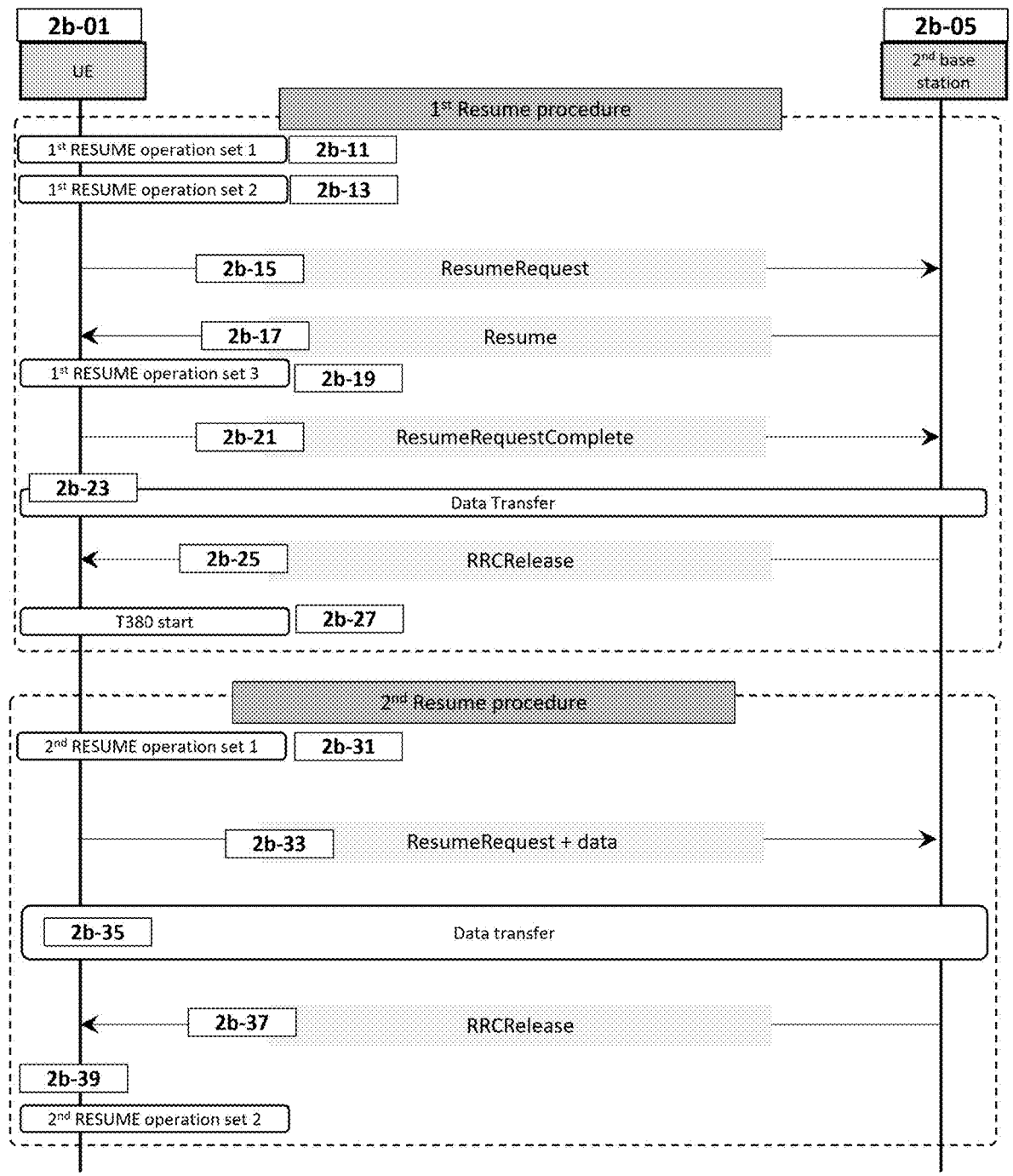
FIG. 2B is a diagram illustrating a first resume procedure and a second resume procedure according to an embodiment of the present invention.

FIG. 2B is a diagram illustrating a first resume procedure and a second resume procedure according to an embodiment of the present invention.

The first resumption procedure is as follows.

In step 2b-11, the terminal performs the first resume operation set 1. The first resume operation set 1 is operations taken when the first resume procedure is started, and as follows. By performing the first operation set 1, the terminal may receive a downlink control message from the base station through SRB1.

<First Resume Operation Set 1>
1. Apply default SRB1 configuration.
2. Apply default MAC Cell Group configuration
3. Start T319 set to t319 received from SIB1.

The default SRB1 configuration is as follows.

TABLE 5

| Name | Value | | |
|---|---|---|---|
| | SRB1 | SRB2 | SRB3 |
| PDCP-Config | | | |
| >t-Reordering | | infinity | |
| RLC-Config CHOICE | | Am | |
| ul-AM-RLC | | | |
| >sn-FieldLength | | size12 | |
| >t-PollRetransmit | | ms45 | |
| >pollPDU | | infinity | |
| >pollByte | | infinity | |
| >maxRetxThreshold | | t8 | |
| dl-AM-RLC | | | |
| >sn-FieldLength | | size12 | |
| >t-Reassembly | | ms35 | |
| >t-StatusProhibit | | ms0 | |
| logicalChannelIdentity | 1 | 2 | 3 |

TABLE 5-continued

| Name | Value | | |
|---|---|---|---|
| | SRB1 | SRB2 | SRB3 |
| LogicalChannelConfig | | | |
| >priority | 1 | 3 | 1 |
| >prioritisedBitRate | | infinity | |
| >logicalChannelGroup | | 0 | |

The default MAC Cell Group configuration is as follows.

TABLE 6

| Name | Value |
|---|---|
| MAC Cell Group configuration | |
| bsr-Config | |
| >periodicBSR-Timer | sf10 |
| >retxBSR-Timer | sf80 |
| phr-Config | |
| >phr-PeriodicTimer | sf10 |
| >phr-ProhibitTimer | sf10 |
| >phr-Tx-PowerFactorChange | dB1 |

T319 set to t319 is a timer to perform follow-up measures, for example, transition to RRC_IDLE, etc., when the first resume procedure fails. T319 set to t319 is stopped when RRCResume is received. If the RRCResume is not received until the T319 set to t319 expires, the terminal performs the T319 expiration operation set.

<T319 Expiration Operation Set>
1. Reset MAC.
2. Discard UE Inactive AS Context.
3. Release suspendConfig.
4. Discard the security key.
5. Release all RLC entities, PDCP entities, and SDAP entities.
6. Transition to RRC_IDLE and perform cell selection operation.

In step 2b-13, the terminal performs the first resume procedure operation set 2. The first resume procedure operation set 2 is operations taken before transmitting the ResumeRequest.

<First Resume Procedure Operation Set 2>
0. Restore RRC configurations of UE Inactive AS context except masterCellGroup and PDCP-config.
1. ResumeMAC-I calculation: Calculate a 16-bit message verification code using the first security key (a security key used in the RRC_CONNECTED state or a security key used at the time of receiving RRC Release).
2. Deriving the second base station security key using the second base station security key. From the second base station security key, the second security key, the third security key, the fourth security key, and the fifth security key are derived.
3. All radio bearers except SRB0 are configured to use second security key and third security key or fourth security key and fifth security key.
3. Reset the PDCP entity of SRB1.
4. Resume SRB1.

In step 2b-15, the terminal transmits a ResumeRequest message to the second base station. The MAC PDU containing the ResumeRequest message does not include data from other radio bearers. ResumeRequest includes the information below.

<ResumeRequest>
1. The first identifier or the second identifier: an identifier indicated in the system information among the first and second identifiers given in SuspendConfig is included.
2. ResumeMAC-I: 16-bit message verification code to ensure integrity of the resume request message. The terminal calculates the resume MAC-I using the previous security key (a security key used in the RRC_CONNECTED state or a security key used at the time of receiving the RRC Release).
3. resumeCause: Indicating one of emergency, highPriorityAccess, mt-Access, mo-Signalling, mo-Data, mo-VoiceCall, mo-VideoCall, mo-SMS, ma-Update, mps-PriorityAccess, mc s-PriorityAccess and smallDataTransfer The terminal performing the first resume procedure selects one of the remaining values except for smallDataTransfer as the resumeCause. This is to enable the base station to determine whether the second resume procedure is performed through the resumeCause.

In step 2b-17, the terminal receives the RRC Resume. RRCResume includes the following information.

<RRCResume>
1. MasterCellGroup: CellGroupConfig for masterCellGroup includes RLC bearer information, MAC configuration information, PHY configuration information, and SpCell configuration information.
2. RadioBearrConfig: It is radio bearer configuration information and includes SRB configuration information and DRB configuration information.

In step 2b-19, the terminal performs the first resume procedure operation set 3.

<First Resume Procedure Operation Set 3>
1. Stop T319.
2: Stop T380.
3: Restore and apply masterCellGroup of UE Inactive AS Context
4: Apply CellGroupConfig and radioBearerConfig in RRCResume
5. Resume SRB2, SRB3, and all DRBs.
6. Transition to RRC_CONNECTED state.
7. Stop cell reselection procedure.

In step 2b-21, the terminal transmits an RRCResumeComplete message to the second base station. The RRCResumeComplete message includes PLMN identifier information selected by the terminal.

In step 2b-23, the terminal and the second base station transmit and receive data. In this case, the terminal may transmit a MAC CE such as BSR or PHR to the base station together. When the BSR trigger condition is satisfied, the terminal multiplexes the BSR in the uplink MAC PDU and transmit the MAC PDU. When the PHR trigger condition is satisfied, the terminal multiplexes the PHR MAC CE in the uplink MAC PDU and transmit the MAC PDU. BSR trigger conditions include arrival of new data with high priority and expiration of periodic timers. PHR trigger conditions include change of reference signal received power more than a predefined threshold, activation of a new secondary cell, and the like.

In step 2b-25, when data transmission/reception with the terminal is completed, the second base station transmits an RRC Release including SuspendConfig to the terminal to transition the terminal to the RRC_INACTIVE state.

In step 2b-27, the terminal receiving the RRCRelease message including SuspendConfig starts T380.

The second resume procedure is as follows.

In steps 2b-31, the terminal performs the second resume operation set 1. The second resume operation set 1 is operations taken when the second resume procedure is triggered as follows. By performing the second resume operation set 1, the terminal may receive a downlink control message from the base station through the SRB1 and transmit uplink data of the radio bearer (or data transmission in the INACTIVE state, or in which the second resume procedure is configured).

<Second Resume Operation Set 1>

0: Restore all RRC configuration of UE Inactive AS Context (including radio bearer settings of the first set of bearers, masterCellGroup, and PDCP-config).

1. start T319ext set to t319ext
2. stop T380
3. ResumeMAC-I calculation: A 16-bit MAC-I is calculated using the previous K_RRCint, that is, the first security key (K_RRCint used in the previous RRC_CONNECTED state or K_RRCint used at the time of receiving RRCRelease).
4. Deriving the second base station security key using the first base station security key and the NCC. From the second base station security key, the second security key, the third security key, the fourth security key, and the fifth security key are derived.
5. Configure the first bearer set to apply the second security key and the third security key or the fourth security key and the fifth security key.
6. Reset the PDCP entity of the first bearer set.
7. Resume the radio bearer of the first bearer set.
8. Stop cell reselection procedure
9. Start the second cell reselection procedure.

T319ext set to t319ext is a timer to perform follow-up measures, for example, transition to RRC_IDLE, etc., when the second resume procedure fails. T319, T319ext, and T380 have the following characteristics.

TABLE 7

| First reconfiguration | | |
| --- | --- | --- |
| | T380 | T319 |
| Configured by | RRCRelease | SIB1 |
| Start | Upon reception of RRCRelease | After start of first reconfiguration procedure, between the time point when configuration received from SIB1 is applied and the time point when SRB1 resumes |
| Stop | Upon reception of RRCResume and before applying cell group configuration | Upon reception of RRCResume and before applying cell group configuration |
| Upon expiration | Initiating periodic RNA update in the current cell | T319 expiry operation set |

| Second reconfiguration | | |
| --- | --- | --- |
| | T380 | T319ext |
| Configured by | RRCRelease | SIB X |
| Start | Upon reception of RRCRelease | After start of second reconfiguration procedure, between the time point when SRB1 configuration stored in UE Inactive AS Context is applied and the time point when SRB1 resumes |
| Stop | After start of second reconfiguration procedure, between the time point when SRB1 configuration stored in UE Inactive AS Context is applied and the time point when SRB1 resumes | Upon reception of RRCRelease or before applying cell group configuration |
| Upon expiration | Determining whether to initiate periodic RNA update in the current cell | T319ext expiry operation set |

In the first resume procedure, T380 and T319 stops before configuring cell group information after receiving the RRCResume message to prevent unnecessary subsequent operation due to the timer expiration by stopping the timers as a first operation after receiving the RRCResume message.

In the first resume procedure, starting T319 between the time point when the default SRB1 configuration is applied and the time point when SRB1 resumes is to start T319 as close as possible to the time point when SRB1 becomes available.

In the second resume procedure, starting T319ext between the time point when SRB1 configuration stored in UE Inactive AS Context is applied and the time point when SRB1 resumes is to start T319ext as close as possible to the time point when SRB1 becomes available.

In the second resume procedure, starting T380 between the time point when SRB1 configuration stored in UE Inactive AS Context is applied and the time point when SRB1 resumes is to start T380 as close as possible to the time point when T319ext starts so that the processing load for timer handling in UE is reduced.

The time point when SRB1 configuration stored in UE Inactive AS Context is applied and the time point when radio bearer configuration for first bearer set stored in UE Inactive AS Context is applied are same.

If the RRCResume is not received until the T319ext set to t319ext expires, the terminal may perform the T319ext expiration operation set or the T319 expiration operation set. The base station may set in SuspendConfig or in system information which one to select between the T319ext expiration operation set and the T319 expiration operation set.

<T319ext expiration operation set>
1. Reset MAC
2. Keep UE Inactive AS Context
3. Keep suspendConfig
4. Discard first base station security key and first security key in UE and store second base station security key and third security key
5. Suspend all SRBs and DRBs
6. Start T380 set to t380
7. Stop second cell reselection procedure
8. Start cell reselection procedure
9. Perform RNA update after selecting a suitable cell The first bearer set is a set of radio bearers for which the second resume procedure is explicitly or implicitly configured and consists of SRB1 and radio bearers related to the second resume procedure. The radio bearer related to the second resume procedure refers to a radio bearer in which the second resume procedure is explicitly allowed or a radio bearer in which the second resume procedure is explicitly configured.

Stopping the cell reselection procedure means stopping the existing cell reselection procedure performed before the second resume procedure starts.

UE preferentially selects, in the existing cell reselection procedure, a frequency to camp on by considering cell reselection priority provided by base station, ranks each cell of the selected frequency by considering reference signal received power and various offsets, and reselects a highest ranked cell.

When the second cell reselection procedure starts, the terminal stops using the cell reselection priority and offsets indicated by the base station and uses the following parameters.

<Second Cell Reselection Procedure>
1. Increase the cell reselection priority of the current serving frequency to the highest priority.
2. Increase the first Qhyst by a predetermined value. Or apply the 2nd Qhyst.

When the terminal determines the cell ranking, the current serving cell is weighted by Qhyst. That is, the ranking is determined by adding Qhyst to the reference signal received power of the current serving cell. The first Qhyst is included in the SIB2 and broadcasted. The second Qhyst or the predetermined value is included in the SIBX and broadcasted.

In steps 2b-33, the terminal transmits a MAC PDU including a first SDU including a ResumeRequest message and data of first bearer set (or data of a bearer in which a second resume procedure is configured) to the second base station. The terminal performing the second resume procedure selects smallDataTransfer as ResumeCause. The terminal may include a priority-based BSR MAC CE and a PHR MAC CE in the MAC PDU. If the BSR/PHR inclusion condition is satisfied and the BSR/PHR cancellation condition is not satisfied, the terminal includes and transmits the priority-based BSR MAC CE and the PHR MAC CE in the MAC PDU. The terminal transmits MAC PDUs that do not include the priority-based BSR and PHR when the BSR/PHR cancellation condition is satisfied even if the BSR/PHR inclusion condition is satisfied.

<BSR/PHR Inclusion Condition>
There is more data for transmission after transmission of the MAC PDU (or first uplink MAC PDU of the second resume procedure) including ResumeRequest, or uplink grant (or first uplink grant of the second resume procedure) for transmission of MAC PDU including ResumeRequest does not accommodate all pending data available for transmission.

<BSR/PHR Cancellation Condition>
An uplink grant (or the first uplink grant of the second resume procedure) for transmission of MAC PDU including ResumeRequest can accommodate all pending data available for transmission if at least one of a triggered BSR and corresponding subheader or a triggered PHR are not included in the MAC PDU but cannot accommodate all pending data available for transmission if both triggered BSR and corresponding subheader and triggered PHR and corresponding PHR are included in the MAC PDU.

In steps 2b-35, the terminal and the base station transmit and receive data of the first bearer set. Data of the first bearer set is scheduled by C-RNTI, and the terminal monitors a frequency region and a time interval, indicated in SIBX, for transmitting and receiving small amounts of data (or for transmitting and receiving data in the second resume procedure).

When the data transmission is completed, the base station determines to terminate the second resume procedure.

In steps 2b-37, the second base station transmits an RRCRelease including SuspendConfig to the terminal to terminate the second resume procedure. When receiving an RRCRelease including SuspendConfig, the terminal performs the second resume procedure operation set 2 to terminate the second resume procedure.

Figure 2C:
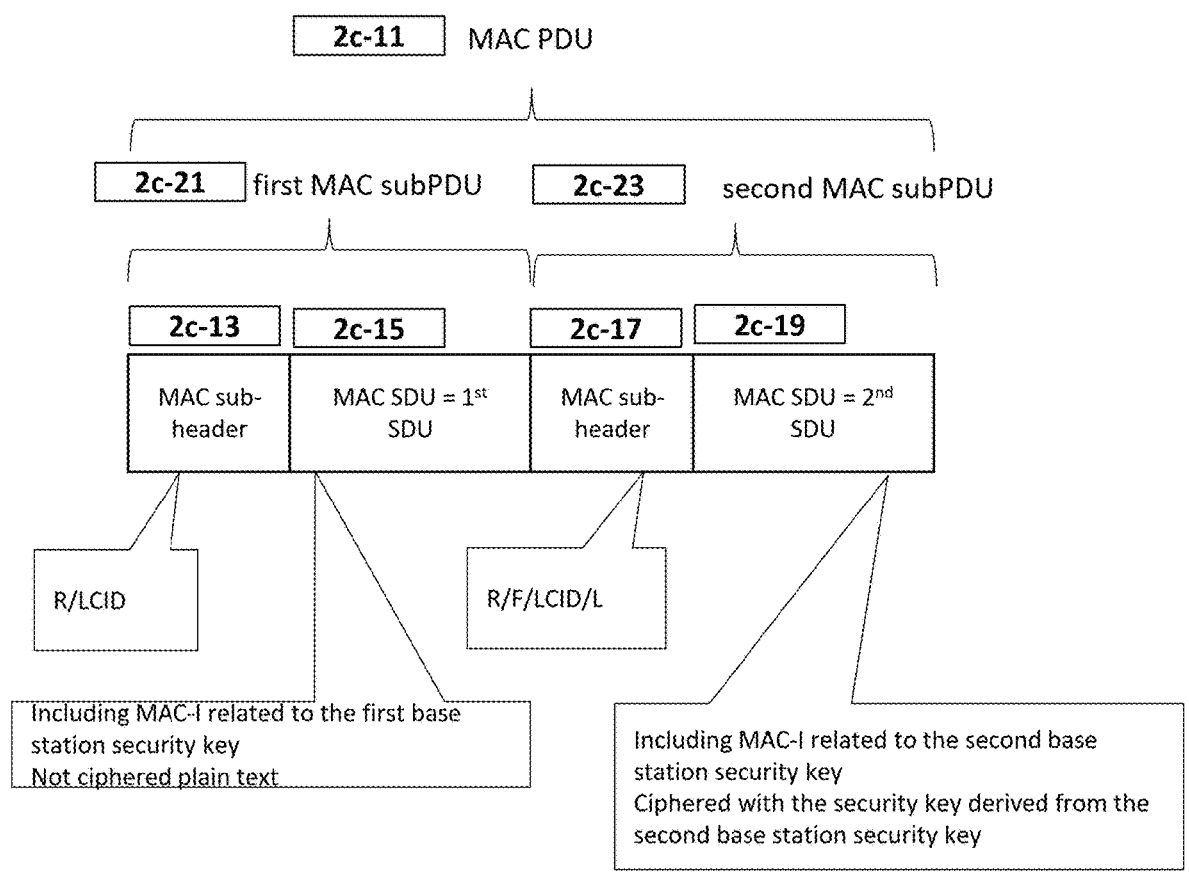
FIG. 2C is a diagram illustrating a structure of an uplink MAC PDU used in a second resume procedure.

<Second Resume Operation Set 2>
1. Stop monitoring frequency region and time interval for small data transmission indicated in SIBX
2. Reset MAC
3. Update suspendConfig
4. Discard first base station security key and first security key in UE and store second base station security key and third security key
5. Suspend all SRBs and DRBs except SRB0
6. Start T380 set to t380
7. Stop second cell reselection procedure
8. Start cell reselection procedure FIG. 2C is a diagram illustrating a structure of an uplink MAC PDU used in a second resume procedure.

The MAC SDU (first SDU) (2c-15) including the ResumeRequest message is located at the front of the MAC PDU (2c-11) and the MAC SDU (second SDU) (2c-19) including the data of the first bearer set (data of the bearer where second resume procedure is configured) is located at the rear of the MAC PDU. This is to enable the base station receiving the MAC PDU to recognize as quickly as possible that the MAC PDU is a MAC PDU related to the second resume procedure. The first SDU includes a part of the MAC-I calculated by the first security key (K_RRCint previously used), and the second SDU includes a MAC-I calculated by the fifth security key (new K_UPenc derived from the second base station security key). The MAC sub-header 2c-13 of the first SDU includes two R bits and an LCID field, and the MAC sub-header 2c-17 of the second SDU includes one R bit, an F field, an LCID field, and an L field. The LCID field indicates which logical channel the corresponding MAC SDU belongs to or which MAC CE is the corresponding MAC CE, and the L field indicates how many bytes the corresponding MAC SDU or MAC CE is. A MAC SDU or MAC CE and corresponding MAC subheader is referred to as a MAC subPDU. The MAC PDU 2c-11 shown in 2c includes two MAC subPDUs 2c-21 and 2c-23. Hereinafter, a structure of the MAC PDU shown in FIG. 2C is referred to as a MAC PDU structure 1. MAC PDU structure 1 is characterized in that a MAC subPDU including a MAC SDU and having an R/LCID subheader locates in front of a MAC subPDU including a MAC SDU and having R/F/LCID/F. This feature allows the base station to process the ResumeRequest message as soon as possible, as described above.

Figure 2D:
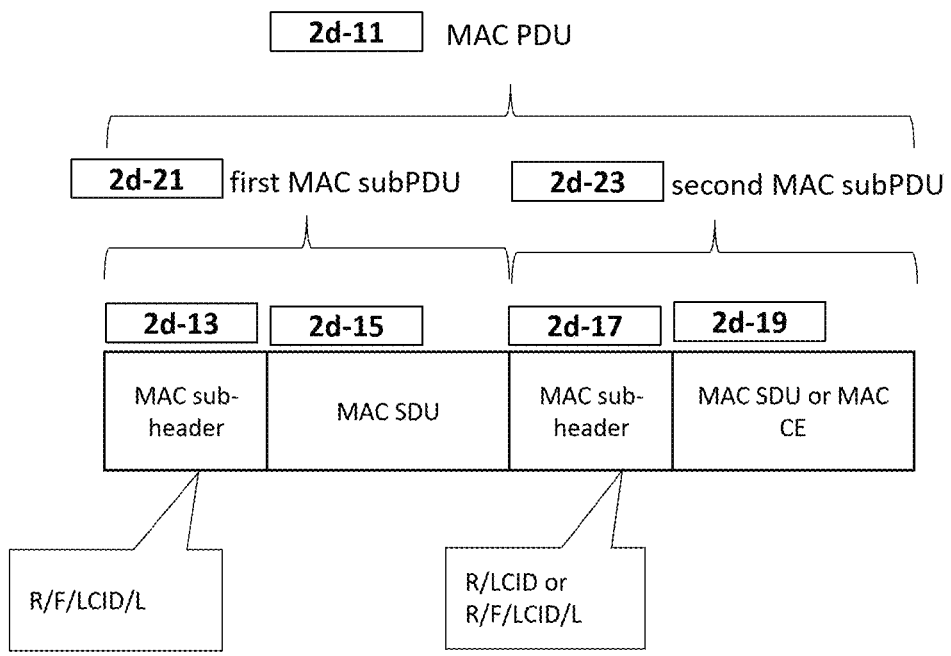
FIG. 2D is a diagram illustrating a structure of a general uplink MAC PDU.

FIG. 2D is a diagram illustrating a structure of a general uplink MAC PDU. Although a MAC PDU including two MAC subPDUs is exemplified, one MAC PDU may include two or more MAC subPDUs. Hereinafter, a structure of the MAC PDU shown in FIG. 2D is referred to as a MAC PDU structure 2. In MAC PDU structure 2, a MAC subPDU having an R/LCID subheader is located behind a MAC subPDU including a MAC SDU with an R/F/LCID/F subheader. MAC subPDUs with R/LCID subheaders correspond to MAC CE in most cases, and by placing MAC subPDUs including MAC CE behind MAC subPDUs including MAC SDUs, the terminal can process MAC subPDUs including MAC SDUs in advance before receiving uplink grant.

The first SDU 2c-15 is a first RRC control message received by the base station. Therefore, the base station and the terminal need to process the first SDU by applying the same configuration without prior consultation. On the other hand, the second SDU 2c-20 may be processed after the base station processes the first SDU and may be processed after the base station restores the UE Inactive AS Context. Accordingly, the second SDU may be processed according to the configuration stored in UE Inactive AS Context.

In the present invention, a first configuration is applied to the first SDU and a second configuration is applied to the second SDU. The first configuration refers to a configuration predetermined in the standard (or a configuration standardized with one value), and the second configuration refers to a configuration stored in the UE Inactive AS Context. Usually, one MAC PDU includes only the MAC SDU to which the first configuration is applied or only the MAC SDU to which the second configuration is applied, but in the present invention, the MAC SDU to which the first configuration is applied and the MAC SDU to which the second configuration is applied are transmitted together in a single MAC PDU. This is to more quickly transmit the MAC SDU to which the second configuration is applied.

The first configuration and the second configuration may include at least PDCP configuration, RLC configuration, and logical channel configuration. The PDCP configuration of the first configuration is PDCP unused, the RLC configuration of the first configuration is RLC™, the logical channel configuration of the first configuration is the highest priority, LCG ID 0, LCID 0, etc. Alternatively, the first configuration may be a default SRB1 configuration.

The second configuration of a bearer where the second resume procedure is configured is as follows. The PDCP configuration is the PDCP configuration of the corresponding bearer stored in the UE Inactive AS Context, the RLC configuration is the RLC configuration of the RLC bearer associated with the corresponding bearer stored in the UE Inactive AS Context (e.g., various timer values), and the logical channel configuration is the RLC bearer's logical channel configuration. The terminal applies, to the PDCP configuration and the RLC configuration, the configuration stored in the UE Inactive AS Context as it is. The terminal applies, to the logical channel configuration, only some of the configurations stored in the UE Inactive AS Context and does not apply the rest as if they were not configured. The logical channel configuration of the radio bearer belonging to the first bearer set consists of an LCID, an LCG ID, a priority, and various restriction-related configurations. In transmitting data of the first bearer set during the second resume procedure, the terminal uses stored values and processes various restriction-related configurations as if they were not configured. Various restriction-related configurations include, for example, allowedServingCells, allowedSCS-List, and maxPUSCH-Duration. If this restriction-related configuration is not configured, the terminal determines that there is no restriction on the corresponding logical channel in transmitting and receiving data of the logical channel. The stored restriction-related configuration may be applied when the first resume procedure is initiated.

When the first SDU (2c-15) and the second SDU (2c-19) are multiplexed in one MAC PDU during the second resume procedure, the terminal applies a predefined configuration for the first SDU, that is, PDCP not used, RLC™, highest priority, LCID0 and LCG ID0. The terminal applies, to the second SDU, overall PDCP configuration of the corresponding bearer, overall RLC configuration of the RLC bearer of the corresponding bearer and some of logical channel configuration of the RLC bearer of the corresponding bearer stored in UE Inactive AS Context and does not apply the rest of logical channel configuration of the RLC bearer of the corresponding bearer. The applied logical channel configuration may be an LCID, a priority and an LCG ID, and the non-applied logical channel configuration may be allowedServingCells, allowedSCS-List, maxPUSCH-Duration, and the like.

The terminal generates SDU1 by applying the first configuration, and generates SDU2 by applying the second configuration.

The uplink MAC PDU may include a MAC SDU or a MAC CE. The MAC CE collectively refers to control information generated and transmitted by a MAC layer such as BSR or PHR. MAC CE may have a fixed size or a variable size. The field L is not used for the MAC subheader of the MAC CE having a fixed size. A general MAC SDU has a variable size and an L field is used for a corresponding sub header. The MAC subPDU including the MAC CE is always located behind the MAC subPDU including the MAC SDU. Therefore, in a general uplink MAC PDU in which at least two MAC subPDUs are multiplexed, a MAC subPDU having an L field is located in front and a MAC subPDU having no L field is located in rear. In general, all MAC SDUs included in one uplink MAC PDU are protected by a security key derived from the same base station security key.

Figure 2E:
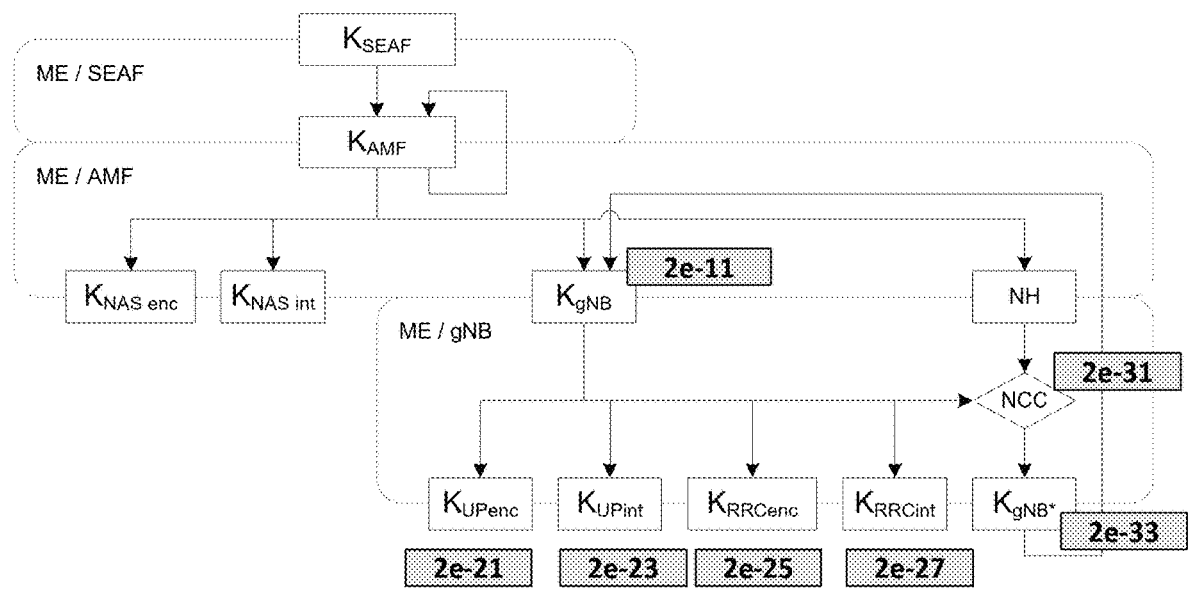
FIG. 2E is a diagram illustrating a hierarchical structure of security keys.

FIG. 2E is a diagram illustrating a hierarchical structure of security keys.

The terminal and the base station perform integrity protection and ciphering using security keys derived from the KgNB 2e-11. Four sub-security keys, K_UPenc (2e-21), K_UPint (2e-23), K_RRCenc (2e-25) and K_RRCint (2e-27) are derived from KgNB (2e-21). KgNB derives KgNB* (2e-33) by inputting NCC (2e-31) or the like during a handover or resume procedure, and new sub-security keys are derived from the KgNB*.

In FIG. 2C, the first SDU (2c-15) is integrity protected by K_RRCint derived from KgNB used in the previous cell, that is, at least a part of the MAC-I calculated by the K_RRCint is included in the first SDU and transmitted together, and the second SDU (2c-19) is integrity protected by K_UPint and ciphered by K_UPenc among sub-security keys of KgNB* derived from NCC and KgNB used in the previous cell.

That is, some of the MAC SDUs included in one MAC PDU during the second resume process are protected by a security key derived from KgNB, and the other MAC SDU is protected by a security key derived from KgNB*.

MAC SDUs multiplexed in the MAC PDU 2d-11 of FIG. 2D are ciphered or integrity protected by a sub-security key derived from one of KgNB and KgNB*.

KgNB previously used or used at the time of receiving RRCRelease is the first base station security key. K_RRCint derived from the first base station security key is the first security key. KgNB* (or derived from the first base station security key and NCC or KgNB derived from the second resumption procedure operation set 1) is the second base station security key. K_RRCenc, K_RRCint, K_UPenc and K_UPint derived from the second security key are denoted as the second security key, the third security key, the fourth security key and fifth security key.

Conventionally, one MAC PDU is ciphered or integrity protected with security keys derived from one base station security key. In the present invention, by multiplexing MAC SDUs protected with security keys derived from different base station security keys into one MAC PDU, the MAC SDUs are transmitted more quickly.

Figure 2F:
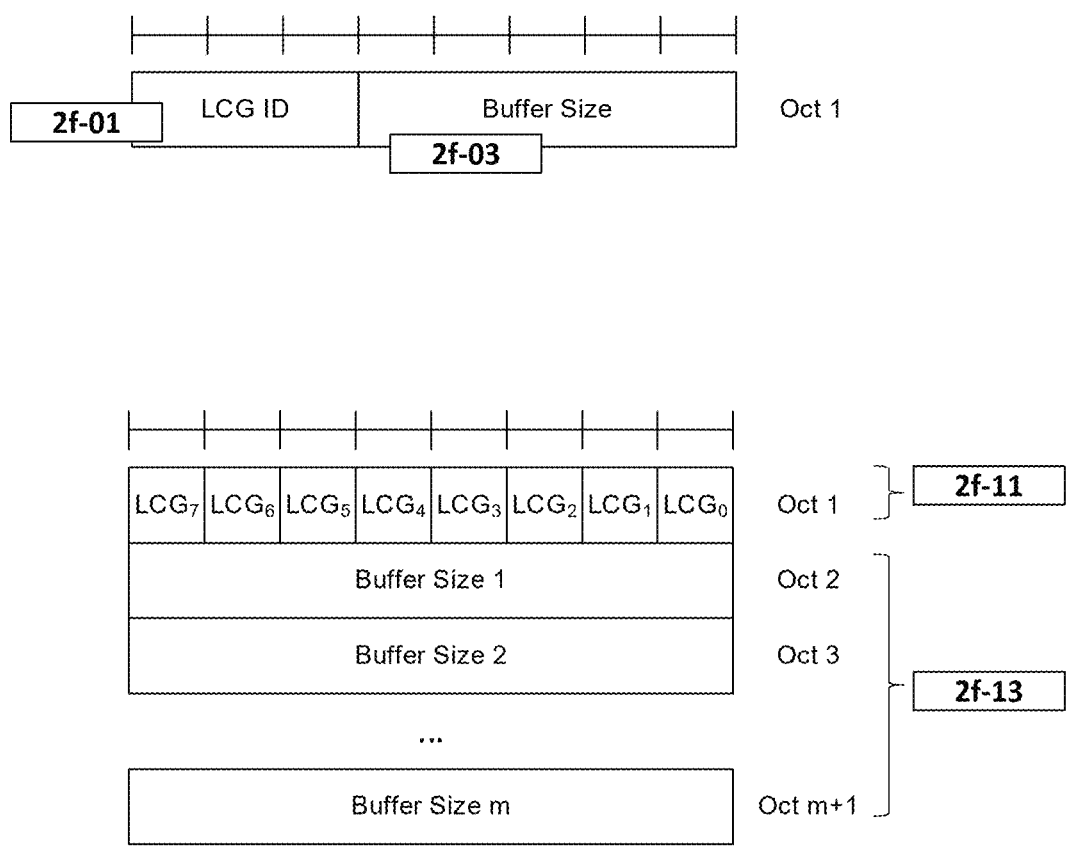
FIG. 2F is a diagram illustrating structures of a first BSR MAC CE and a second BSR MAC CE.
Figure 2G:
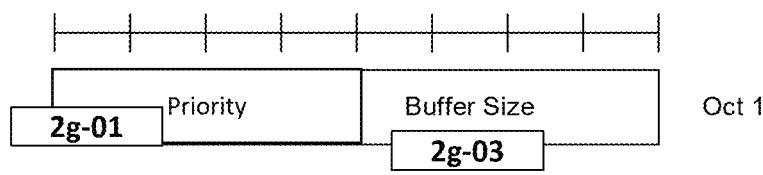
FIG. 2G is a diagram illustrating structures of a third BSR MAC CE and a fourth BSR MAC CE.
Figure 2G:
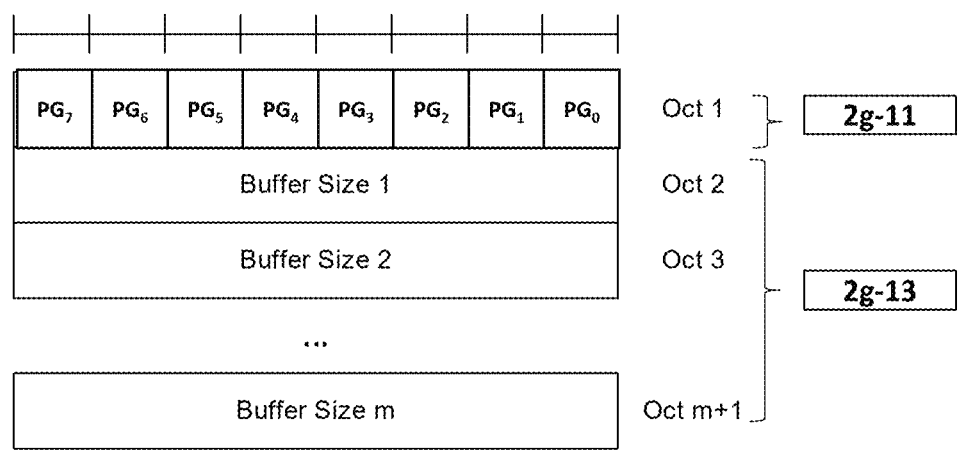
Figure 2H:
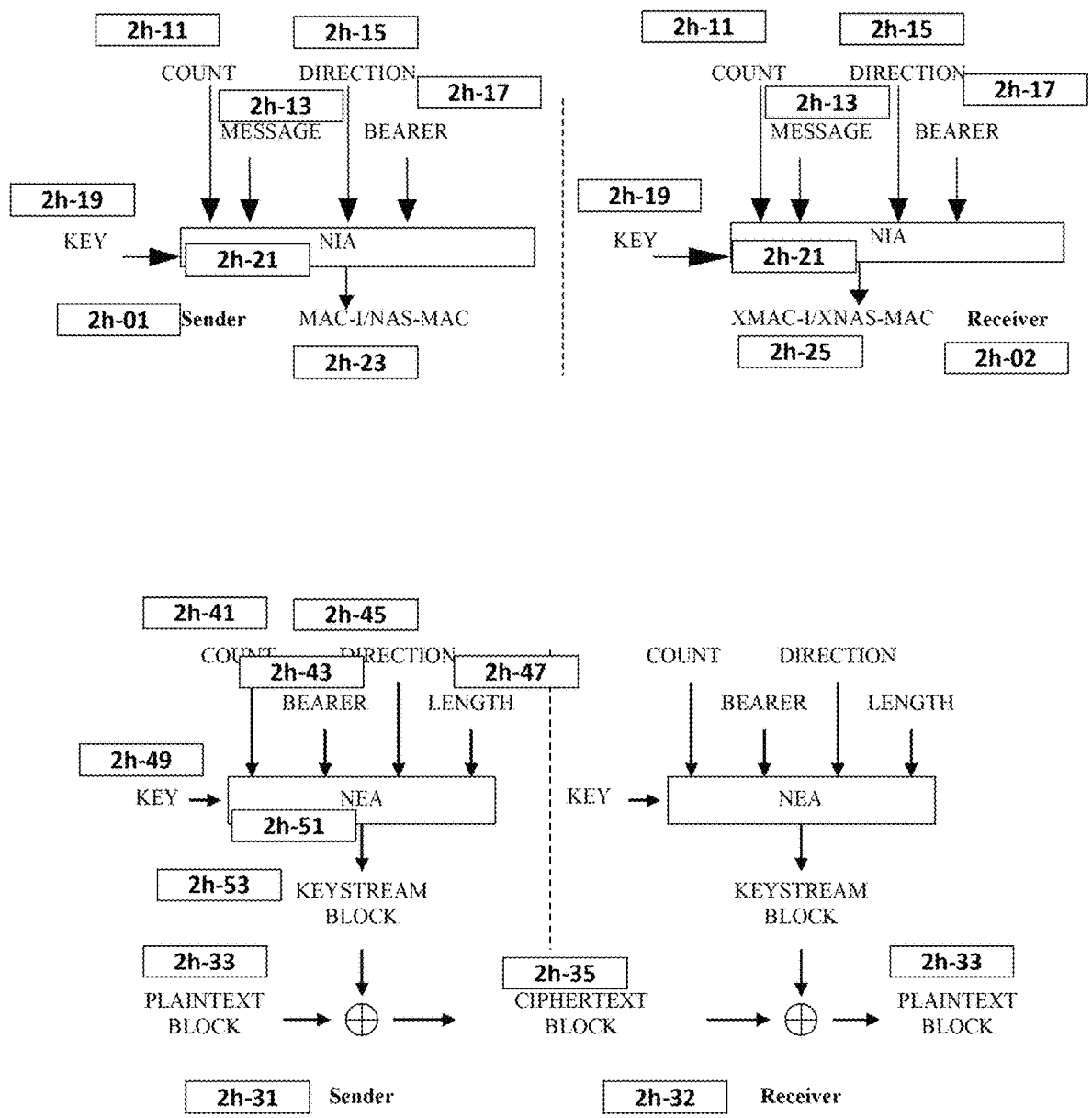
FIG. 2H is a diagram illustrating a MAC-I calculation process and ciphering process.

FIG. 2H is a diagram illustrating a MAC-I calculation process and ciphering process.

The transmitting end 2h-01 generates MAC-I and transmits the MAC-I to the receiving end 2h-02. The transmitting end generates MAC-I (2h-23) by inputting the security key (2h-19), COUNT (2h-11), message (2h-13), DIRECTION (2h-15), and BEARER (2h-17) into the NIA (NR Integrity Algorithm) (2h-21) and transmits the generated MAC-I (2h-23) to the receiving end.

The receiving end also calculates XMAC-I (2h-25) by inputting the security key (2h-19), COUNT (2h-11), message (2h-13), DIRECTION (2h-15), and BEARER (2h-17) into the NR integrity algorithm (NIA 2h-21), and determines that the received MAC-I is the same. MAC-I and XMAC-I may be the same only when the same NR integrity algorithm (NIA 2h-21), the same security key (2h-19), the same COUNT (2h-11), the same message (2h-13), the same DIRECTION (2h-15), and the same BEARER (2h-17) are used at the transmitting end and receiving ends. MAC-I has a 32-bit size.

MAC-I included in the first SDU 2c-15 of the uplink MAC PDU 2c-11 of the second resume process is the last 16 bits of MAC-I calculated using a first security key, a COUNT set to all 0s, a DIRECTION set to 0 and a message consisting of an identifier of a terminal and an identifier of a cell.

The MAC-I included in the second SDU (2c-19) of the uplink MAC PDU (2c-11) of the second resume process is for a PDCP SDU belonging to the first bearer set, and is calculated using a fifth security key, a COUNT of the PDCP SDU, a DIRECTION set to 0, and a DRB identifier, and a message that is the PDCP SDU.

The transmitting end 2h-31 processes a simple text to a ciphered block as follows and transmits the same to the receiving end 2h-32. The transmitting end generates a keystream block (2h-53) by inputting a security key (2h-49), a COUNT (2h-41), a BEARER (2h-43), a DIRECTION (2h-45), and a LENGTH (2h-47) into the NR Encryption Algorithm (NEA) (2h-51). The transmitting end generates a ciphered block 2h-35 by applying exclusively OR calculation to the generated keystream block with simple text 2h-33, and transmits the generated ciphered block to the receiving end. The LENGTH is the length of the simple text.

The receiving end inversely converts the received ciphered block into simple text using the same input and the same security key.

The second SDU 2c-19 of the uplink MAC PDU 2c-11 of the second resume process may include a ciphered PDCP SDU of the first bearer set. The PDCP SDU is ciphered using a fourth security key, a COUNT of the PDCP SDU, a DIRECTION set to 0, a DRB identifier BEARER, and a PDCP SDU length LENGTH.

FIG. 2F is a diagram illustrating structures of a first BSR MAC CE and a second BSR MAC CE, which are BSR based on a logical channel group.

The first BSR MAC CE includes one logical channel group identifier field 2f-01 and one first buffer size field 2f-03. The logical channel group identifier field 2f-01 has a size of 3 bits and indicates one of the logical channel group identifiers between 0 and 7. The first buffer size field 2f-03 has a 5-bit size and indicates one of the first buffer size indexes between 0 and 31. The first buffer size index 0 means that there is no data available for transmission in the logical channels belonging to the corresponding logical channel group. The first buffer size index 31 means that the sum of data available for transmission of the logical channels belonging to the corresponding logical channel group is greater than the 30th first buffer size. The first buffer size index 1 means that sum of data available for transmission of the logical channels belonging to the corresponding logical channel group is greater than 0 and less than or equal to the first buffer size. The first buffer size index n (2<=n<=30) indicates that sum of data available for transmission of the logical channels belonging to the corresponding logical channel group is greater than or equal to the n−1th first buffer size and less than or equal to the nth first buffer size. The 30 first buffer sizes are defined in the standard.

The second BSR MAC CE includes eight LCGi bits 2f-11 and a plurality of second buffer size fields 2f-13. The LCGi bit indicates whether a second buffer size field exists for the logical channel group i. For example, it indicates whether a second buffer size field exists for LCG1 logical channel group 1. If this field is 1, a second buffer size field exists for the corresponding LCG. The second buffer size field has an 8-bit size and indicates one of the second buffer size indexes between 0 and 255. The second buffer size index 0 means that there is no data available for transmission in the logical channels belonging to the corresponding logical channel group. The second buffer size index 254 means that the sum of data available for transmission of the logical channels belonging to the corresponding logical channel group is greater than the 253rd second buffer size. The second buffer size index 1 means that sum of data available for transmission of the logical channels belonging to the corresponding logical channel group is greater than 0 and less than or equal to the first second buffer size. The second buffer size index n (2<=n<=253) indicates that the sum of data available for transmission of the logical channels belonging to the corresponding logical channel group is greater than or equal to the n−1th second buffer size and less than or equal to the nth second buffer size. The second buffer size index 255 is not used. The 252 second buffer sizes are defined in the standard.

The logical channel group is configured when the logical channel is configured. The logical channel and the logical channel group are configured by RRC control messages.

FIG. 2G is a diagram illustrating structures of a third BSR MAC CE and a fourth BSR MAC CE, which are priority-based BSRs. The third BSR MAC CE includes one priority identifier field 2g-01 and one third buffer size field 2g-03. The priority identifier field has a size of 4 bits. The priority identifier field indicates one value between 0 and 15, which corresponds one-on-one to the logical channel priority between 1 and 16. That is, adding 1 to the value of the priority identifier field is equal to the actual priority. For example, the priority identifier field 0000 means priority 1, 0001 means priority 2, and 1111 means priority 16. The third buffer size field indicates a third buffer size index between 0 and 15 with a 4-bit size. Unlike the first buffer size index 0 or the second buffer size index 0, the third buffer size index 0 means that the sum of data available for transmission of the logical channels having a corresponding priority is equal to or greater than 0 and smaller than the first third buffer size. The third buffer size index n (2<=n<=14) indicates that the sum of data available for transmission of the logical channels having a corresponding priority is greater than or equal to the n−1th third buffer size and less than or equal to the nth third buffer size. The third buffer size index 15 means that the sum of data available for transmission of the logical channels having a corresponding priority is greater than the 15th third buffer size. The first buffer sizes, the second buffer sizes, and the third buffer sizes are predefined in the specification. The 15 third buffer sizes are defined in the standard.

The fourth BSR MAC CE includes PGi bits and a plurality of second buffer size fields.

PGi indicates whether a second buffer size field of the priority group identifier i exists. The priority group consists of at least one priority, and eight groups could be configured from priority group 0 to priority group 7 in one cell. The priority for each logical channel is configured by a predetermined RRC control message received from the first NR cell, and the mapping relationship between the priority and the priority group is configured by a predetermined system information received from the second NR cell. The system information may be SIBX. For example, a list of priorities mapped per priority group may be broadcast through the SIBX.

Figure 3A:
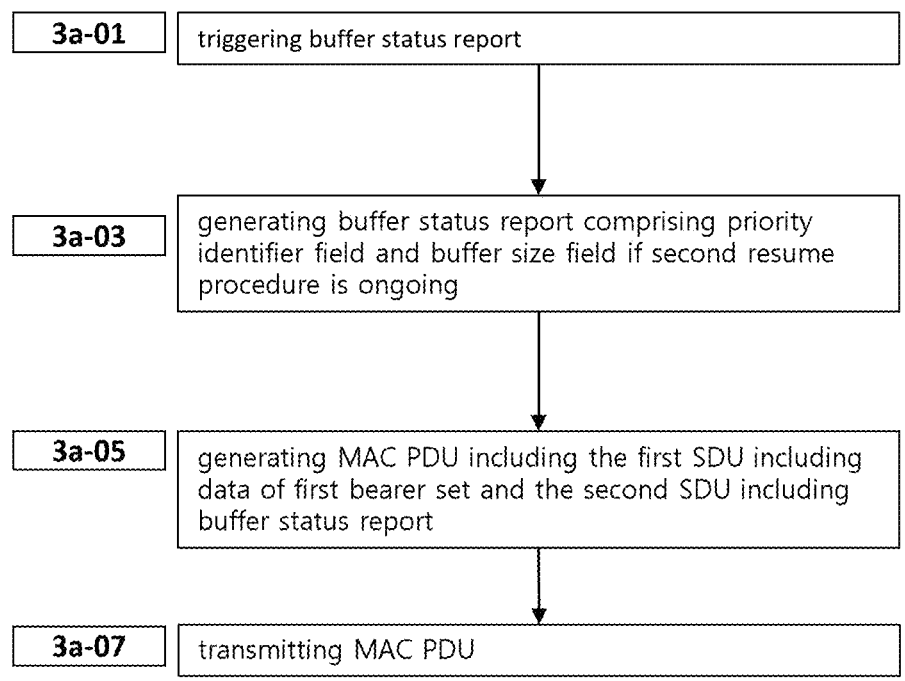
FIG. 3A is a flow diagram illustrating an operation of a terminal.

FIG. 3A is a flow diagram illustrating an operation of a terminal.

In step 3a-01, the UE monitors whether the buffer status report is triggered. The UE proceeds to the next step when the buffer status report is triggered. The buffer status report is triggered when new data arrives, the retransmission timer expires, or the periodic timer expires.

In step 3a-03, the UE determines which one to be generated between the buffer status report including the priority identifier field and the buffer status report including the logical channel group field. If the buffer status report is triggered when the second resume procedure is in progress or the buffer status report is triggered to the UE in the RRC_INACTIVE state, the base station receiving the buffer status report cannot interpret the logical channel group identifier of the UE, so the UE first generates a priority identifier-based buffer status report.

The priority identifier-based buffer status report consists of a 4-bit priority identifier field and a 4-bit buffer size field. The value indicated in the priority field is one-to-one with the priority. The value obtained by adding 1 to the indicated value in the priority field is the actual priority. The buffer size field contains information related to the total amount of transmittable data having the priority indicated in the priority field.

The logical channel group-based buffer status report consists of a 3-bit logical channel group field and a 5-bit buffer size field.

The priority-based buffer status report and the logical channel group-based buffer status report use different LCIDs.

After generating the priority-based buffer status report, the UE starts a periodic timer and a retransmission timer. The periodic timer and retransmission timer apply a periodic timer value stored in MAC configuration information of a terminal context and a retransmission timer value stored in MAC configuration information of a terminal context.

The priority identifier field of the priority-based buffer status report is set to a value determined based on the priority stored in the logical channel configuration information of the terminal context.

When the second resume procedure is started, the terminal restores MAC configuration information and logical channel configuration information of the terminal context.

If there is at least one logical channel in which data to be transmitted exists and the priorities of the logical channels are different from each other, the terminal generates a buffer status report composed of a priority group identifier bitmap and a plurality of buffer size fields. The priority group can be configured for each cell and is configured by the system information. The priority is configured for each terminal and is configured by an RRC control message.

In step 3a-05, the terminal includes a first MAC subPDU including an uplink control message including a terminal identifier and a reason for resumption, a second MAC subPDU including data of the first bearer group, and a third MAC including a buffer status report A MAC PDU including a subPDU is generated. The first MAC subPDU includes a first MAC subheader and a first MAC SDU corresponding to the uplink control message, and the second MAC subPDU includes a second MAC subheader and a second MAC SDU corresponding to data of the first bearer group, and the third MAC subPDU includes a third MAC subheader and a MAC CE.

The first MAC subheader is located immediately before the first MAC SDU, the first MAC SDU is located immediately before the second MAC subheader, the second MAC subheader is located immediately before the second MAC SDU, and the second MAC SDU is located immediately before the third MAC subhead, the third MAC subheader is located immediately before the MAC CE.

A part of the first MAC subPDU is protected with a security key derived from the first base station security key, a part of the second MAC subPDU is protected with a security key derived from the second base station security key, and the third MAC subPDU is not protected.

In step 3a-07, the terminal transmits the generated uplink MAC PDU.

In step 3a-03, the terminal generates a buffer status report comprising a logical channel group identifier field and a buffer size field if the second resumption procedure is not in progress. A buffer status report composed of a priority identifier field and a buffer size field and a buffer status report composed of a logical channel group identifier field and a buffer size field use different LCIDs.

After generating a buffer status report composed of an identifier field and a buffer size field, the UE starts a periodic timer and a retransmission timer to which the values stored in the UE Inactive AS Context are applied.

In the priority field, a value indicating a priority of a logical channel in which data to be transmitted is available is set, and the priority is a priority of logical channel configuration information of the UE Inactive AS Context.

When there is more than one logical channel in which data to be transmitted exists and the priorities of the logical channels are different, the terminal generates a buffer status report composed of a priority group bitmap and a plurality of buffer size fields. At this time, the priority of the logical channel is set with the RRC control message and the priority group is set with the system information.

Figure 4A:
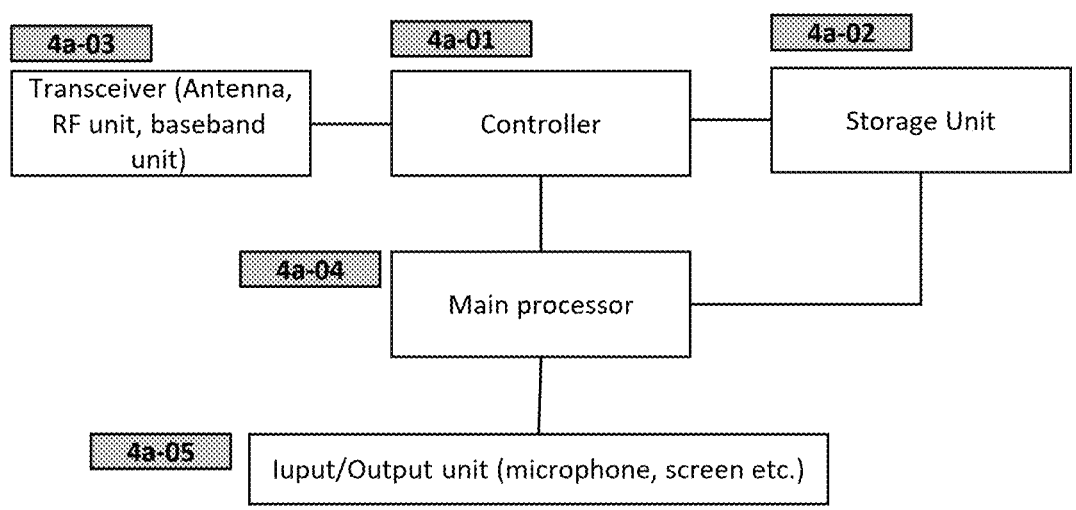
FIG. 4A is a block diagram illustrating the internal structure of a UE to which the disclosure is applied.

FIG. 4A is a block diagram illustrating the internal structure of a UE to which the disclosure is applied.

Referring to the diagram, the UE includes a controller (4a-01), a storage unit (4a-02), a transceiver (4a-03), a main processor (4a-04) and I/O unit (4a-05).

The controller (4a-01) controls the overall operations of the UE in terms of mobile communication. For example, the controller (4a-01) receives/transmits signals through the transceiver (4a-03). In addition, the controller (4a-01) records and reads data in the storage unit (4a-02). To this end, the controller (4a-01) includes at least one processor. For example, the controller (4a-01) may include a communication processor (CP) that performs control for communication and an application processor (AP) that controls the upper layer, such as an application program. The controller controls storage unit and transceiver such that UE operations illustrated in FIG. 2A and FIG. 2B and FIG. 3A are performed.

The storage unit (4a-02) stores data for operation of the UE, such as a basic program, an application program, and configuration information. The storage unit (4a-02) provides stored data at a request of the controller (4a-01).

The transceiver (4a-03) consists of a RF processor, a baseband processor and plurality of antennas. The RF processor performs functions for transmitting/receiving signals through a wireless channel, such as signal band conversion, amplification, and the like. Specifically, the RF processor up—converts a baseband signal provided from the baseband processor into an RF band signal, transmits the same through an antenna, and down—converts an RF band signal received through the antenna into a baseband signal. The RF processor may include a transmission filter, a reception filter, an amplifier, a mixer, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor (4a-04) controls the overall operations other than mobile operation. The main processor (4a-04) process user input received from I/O unit (4a-05), stores data in the storage unit (4a-02), controls the controller (4a-01) for required mobile communication operations and forward user data to I/O unit (905).

I/O unit (4a-05) consists of equipment for inputting user data and for outputting user data such as a microphone and a screen. I/O unit (4a-05) performs inputting and outputting user data based on the main processor's instruction.

Figure 4B:
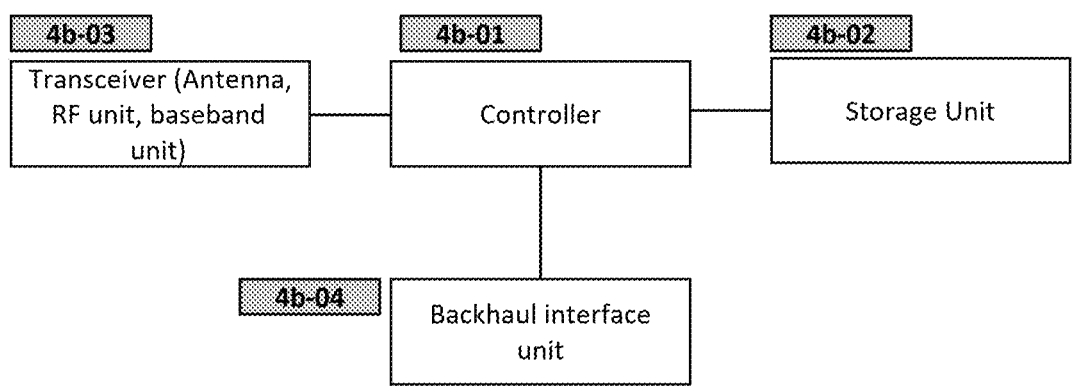
FIG. 4B is a block diagram illustrating the configuration of a base station according to the disclosure.

FIG. 4B is a block diagram illustrating the configuration of a base station according to the disclosure.

As illustrated in the diagram, the base station includes a controller (4b-01), a storage unit (4b-02), a transceiver (4b-03) and a backhaul interface unit (4b-04).

The controller (4b-01) controls the overall operations of the main base station. For example, the controller (4b-01) receives/transmits signals through the transceiver (4b-03), or through the backhaul interface unit (4b-04). In addition, the controller (4b-01) records and reads data in the storage unit (4b-02). To this end, the controller (4b-01) may include at least one processor. The controller controls transceiver, storage unit and backhaul interface such that base station operation illustrated in FIG. 2A and FIG. 2B are performed.

The storage unit (4b-02) stores data for operation of the main base station, such as a basic program, an application program, and configuration information. Particularly, the storage unit (4b-02) may store information regarding a bearer allocated to an accessed UE, a measurement result reported from the accessed UE, and the like. In addition, the storage unit (4b-02) may store information serving as a criterion to deter mine whether to provide the UE with multi-connection or to discontinue the same. In addition, the storage unit (4b-02) provides stored data at a request of the controller (4b-01).

The transceiver (4b-03) consists of a RF processor, a baseband processor and plurality of antennas. The RF processor performs functions for transmitting/receiving signals through a wireless channel, such as signal band conversion, amplification, and the like. Specifically, the RF processor up—converts a baseband signal provided from the baseband processor into an RF band signal, transmits the same through an antenna, and down—converts an RF band signal received through the antenna into a baseband signal. The RF processor may include a transmission filter, a reception filter, an amplifier, a mixer, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit (4b-04) provides an interface for communicating with other nodes inside the network. The backhaul interface unit (4b-04) converts a bit string transmitted from the base station to another node, for example, another base station or a core network, into a physical signal, and converts a physical signal received from the other node into a bit string.

What is claimed is:

1. A method performed by a terminal, the method comprising:
   receiving, by the terminal and in a first cell, a first Radio Resource Control (RRC) message, wherein the first RRC message comprises a first set of parameters for a second resume procedure;
   determining, by the terminal and in the first cell, one or more radio bearers configured for the second resume procedure based on the first set of parameters;
   performing by the terminal cell selection from the first cell to a second cell;

receiving, by the terminal and in the second cell, a system information, wherein the system information comprises a second set of parameters for the second resume procedure;

initiating by the terminal and in the second cell, a first resume procedure or the second resume procedure based on
   the first set of parameters; and
   the second set of parameters;

re-establishing, by the terminal and in the second cell, Packet Data Convergence Protocol (PDCP) entity of Signaling Radio Bearer 1 (SRB1);

transmitting by the terminal and in the second cell, a second Radio Resource Control (RRC) message; and receiving, by the terminal and in the second cell, a third RRC message, wherein a cell group configuration for master cell group is restored before PDCP entities of the one or more radio bearers configured for the second resume procedure are re-established in case that the second resume procedure is initiated.

2. The method of claim 1, wherein the cell group configuration for master cell group is restored after PDCP entities of the one or more radio bearers configured for the second resume procedure are re-established in case that the first resume procedure is initiated.

3. The method of claim 1, wherein the first set of parameters comprises a Signaling Radio Bearer 2 (SRB2)-indicator and a Data Radio Bearer (DRB) list.

4. The method of claim 1, wherein the second set of parameters comprises a first threshold and a second threshold.

5. The method of claim 4, wherein the first threshold is related to a reference signal reception power and the second threshold is related to a data volume.

6. The method of claim 1, wherein the second resume procedure is initiated in case that:
   data volume of the radio bearers configured for the second resume procedure is smaller than a second threshold indicated in the second set of parameters; and
   reference signal reception power is greater than a first threshold indicated in the second set of parameters.

7. The method of claim 1, wherein the first resume procedure is initiated in case that:
   data volume of the radio bearers configured for the second resume procedure is greater than a second threshold indicated in the second set of parameters; or
   reference signal reception power is lower than a first threshold indicated in the second set of parameters.

8. The method of claim 1, wherein the first RRC message further comprises:
   a first identifier;
   a second identifier; and
   a count.

9. The method of claim 1, wherein the second RRC message comprises:
   a first identifier comprised in the first RRC message;
   a Message Authentication Code for Integrity (MAC-I); and
   a field indicating resume cause.

10. The method of claim 1, wherein the third RRC message comprises:
   parameters for the cell group configuration for master cell group; and
   parameters for radio bearer configuration.

11. The method of claim 1, wherein in case that the second resume procedure is initiated and after the cell group configuration for master cell group is restored:
   PDCP entities of the one or more radio bearers configured for the second resume procedure are re-established; and
   the one or more radio bearers configured for the second resume procedure are resumed.

12. The method of claim 1, wherein in case that the first resume procedure is initiated and after the cell group configuration for master cell group is restored:
   PDCP entities of Data Radio Bearers (DRBs) are re-established; and
   DRBs are resumed.

13. The method of claim 1, wherein in case that the second resume procedure is initiated:
   the second RRC message is transmitted within a first Medium Access Control (MAC) Service Data Unit (SDU);
   the first MAC SDU is comprised in a MAC Protocol Data Unit (PDU); and
   the MAC PDU further comprises a second MAC SDU.

14. The method of claim 13, wherein:
   the first MAC SDU comprises a first MAC-I generated based on a first security key; and
   the second MAC SDU comprises a second MAC-I generated based on a second security key.

15. The method of claim 14, wherein:
   the first security key is not derived from a count comprised in the first RRC message; and
   the second security key is derived from the count comprised in the first RRC message.

16. The method of claim 13, wherein the MAC PDU further comprises a Power Headroom Report (PHR).

17. The method of claim 16, wherein, within the MAC PDU:
   the first MAC SDU is placed before the second MAC SDU; and
   the second MAC SDU is placed before the PHR.

18. The method of claim 1, wherein the first resume procedure is to resume suspended RRC connection and the second resume procedure is for small data transmission in RRC_INACTIVE state.

19. A terminal in a wireless communication system, the terminal comprising:
   a transceiver configured to transmit and receive a signal; and
   a controller configured to control the transceiver to:
      receive in a first cell a first Radio Resource Control (RRC) message, wherein the first RRC message comprises a first set of parameters for a second resume procedure;
      determine in the first cell a one or more radio bearers configured for the second resume procedure based on the first set of parameters;
      perform cell selection from the first cell to a second cell;
      receive in the second cell a system information, wherein the system information comprises a second set of parameters for the second resume procedure;
      initiate in the second cell a first resume procedure or the second resume procedure based on:
         the first set of parameters; and
         the second set of parameters;
      re-establish in the second cell Packet Data Convergence Protocol (PDCP) entity of Signaling Radio Bearer 1 (SRB1);

transmit in the second cell a second Radio Resource Control (RRC) message; and
receive in the second cell a third RRC message,
wherein a cell group configuration for master cell group is restored before PDCP entities the one or more radio bearers configured for the second resume procedure are re-established in case that the second resume procedure is initiated.

* * * * *